United States Patent [19]

Tasaki et al.

[11] Patent Number: 4,783,823
[45] Date of Patent: Nov. 8, 1988

[54] CARD IDENTIFYING METHOD AND APPARATUS

[75] Inventors: Hisashi Tasaki; Kimikazu Endo, both of Kyoto; Ichiro Miyagi; Shinichiro Tsunemi, both of Takatsuki; Yuichi Saida, Kameoka; Katsuo Nakagaki, Takatsuki, all of Japan

[73] Assignee: Omron Tateisi Electronics, Co., Kyoto, Japan

[21] Appl. No.: 908,986

[22] Filed: Sep. 18, 1986

[30] Foreign Application Priority Data

Sep. 16, 1985 [JP] Japan ................. 60-228801
Sep. 18, 1985 [JP] Japan ................. 60-205768
Sep. 18, 1985 [JP] Japan ................. 60-205769
Sep. 18, 1985 [JP] Japan ................. 60-205770
Oct. 18, 1985 [JP] Japan ................. 60-233922
Oct. 18, 1985 [JP] Japan ................. 60-233923

[51] Int. Cl.$^4$ .................................. G06K 9/00
[52] U.S. Cl. .............................. 382/4; 382/2; 283/92; 235/380
[58] Field of Search ............... 382/2, 4; 283/92; 340/825.3, 825.31, 825.33; 235/380

[56] References Cited

U.S. PATENT DOCUMENTS

| 4,179,686 | 12/1979 | Bonicalzi et al. | 382/2 |
| 4,180,207 | 12/1979 | Lee | 382/2 |
| 4,219,599 | 8/1980 | Idelson et al. | 283/92 |
| 4,414,684 | 11/1983 | Blonder | 382/4 |
| 4,582,985 | 4/1986 | Löfberg | 382/4 |

Primary Examiner—John W. Shepperd
Assistant Examiner—Michael D. Parker
Attorney, Agent, or Firm—Stevens, Davis, Miller & Mosher

[57] ABSTRACT

A card and a card identifying apparatus. The card is imparted with a predetermined characteristic information in the form of an embossment pattern, a character pattern, a fingerprint pattern, a colored pattern or a combination of selected ones of these patterns, while information corresponding to the predetermined characteristic information is stored in a memory incorporated in the card. Upon insertion of the card into the card identifying apparatus, the latter senses the characteristic information while reading out the corresponding information from the card for collation. When coincidence is found between both information, it is decided that the card is genuine.

16 Claims, 30 Drawing Sheets

CARD IDENTIFYING METHOD AND APPARATUS

BACKGROUND OF THE INVENTION

1. Field of the Invention

The present invention relates to a card identifying method and apparatus for determining genuineness or spuriousness of cards such as magnetic card, IC (integrated circuit) cards, optical cards or the like.

2. Description of the Prior Art

A magnetic card used in an automatic cash dispenser installed in a bank is conventionally composed of a base plate of a plastic material, and a magnetic stripe provided on a surface area of the plastic base plate. In use, the magnetic card is inserted into the cash dispenser and a customer (card user) inputs a cipher number with ten keys of a keyboard. The card identifying apparatus responds to the presence of the card to compare the inputted cipher number with data stored previously in the magnetic stripe of the card. In dependence on the result of the comparison, it is determined whether the inserted card is genuine (an authorized or legal card) or spurious (an unauthorized or illegal card) or whether the card user or holder is an unauthorized person.

The card identification mentioned above is however disadvantageous in that there is a probability of a legal card being illegally counterfeited. More specifically, a person who had a chance to get an original card of an authorized holder in some way may be in the position to read data written in the magnetic stripe of the card and transfer the data to a blank card and then return the original card to the authorized holder. In that case, two cards are present availably without being known by the authorized person.

In the case of other cards such as telephone cards and the like, a purchaser of the card may have a chance to prepare a number of copied cards from the purchased card.

SUMMARY OF THE INVENTION

In light of the state of the art, it is an object of the present invention to provide a card identifying method which is capable of discriminatively identifying a genuine or authorized card from illegally copied cards prepared by transferring data from the genuine card to a blank card by using a card reader and/or a card writer.

It is a second object of the present invention to provide a card identifying method for making decision of a card as to genuineness or spuriousness thereof by examining or checking an embossed area, a pattern, a color imparted to the card.

It is a third object of the present invention to provide a card which is so implemented that a copy thereof cannot be prepared simply through data transfer by means of a card reader and/or a card writer.

In view of the above and other objects which will be more apparent as description proceeds, there is proposed according to a general aspect of the present invention a card identifying method in which upon insertion of a card incorporating a memory for storing previously information or data indicative of a feature characterizing the card, the card characterizing feature is detected and the resulting data is compared with the information read out from the memory, wherein upon coincidence being found, the card is determined as an authorized or legal one (i.e. genuine card).

In a preferred embodiment of the present invention, the memory integrally incorporated in the card may be previously placed with color information corresponding to a color imparted to a card. In use of the card, the color thereof is measured and the resulting information is compared with the color information read out from the memory. When the comparison results in coincidence, the card is determined to be an authorized one.

According to another aspect of the present invention, there is provided a card composed of a substrate constituting a base plate of the card, a pattern reading element disposed on the substrate, a spacer disposed on the substrate so as to enclose the pattern reading element, a light transmitting plate disposed on an upper surface of the spacer, and an optical pattern disposed on a lower surface of the light transmitting plate in opposition to the pattern reading element, wherein upon reading of the card, the optical pattern is read by the pattern reading element under the command of control means provided internally and externally of the card, and the card is identified as an authorized one when the optical pattern coincides with a predetermined pattern.

According to another aspect of the present invention, there is provided an apparatus for determining genuineness of a card on which information used for determination of the genuineness of the card is recorded in a card area applied a phosphorescent material. Thus, by reading the information, decision as to the genuineness or spuriousness can be made. With this arrangement, correct identification of the card can be assured so far as the recording of identification (ID) information in the phosphorescent area cannot be known, even when the transaction information and/or ID information recorded in the card is made available by copying.

According to still another aspect of the present invention, there is provided an apparatus for identifying genuineness of a card including means for reading an area of a predetermined color provided on a surface of the card, means for storing a reference area of the color, and means for comparing the area sensed by the reading means with the reference area stored in the storing means for determining genuineness or spuriousness of the card.

The above and other objects, features and advantages of the present invention will be more apparent upon reading the following detailed description of the preferred embodiments made in conjunction with the accompanying drawings.

BRIEF DESCRIPTION OF THE DRAWINGS

FIGS. 12-1 and 12-2 show flow charts for illustrating operation of the card identifying apparatus according to the third embodiment of the invention;

FIGS. 17-1 and 17-2 show flow charts for illustrating operation of the card identifying apparatus according to the fourth embodiment of the invention;

FIGS. 22-1 and 22-2 show flow charts for illustrating operation of the card identifying apparatus according to the fifth embodiment of the invention;

DESCRIPTION OF THE PREFERRED EMBODIMENTS

Now, the invention will be described in detail in conjunction with exemplary embodiments thereof by referring to the accompanying drawings.

Figure 1:
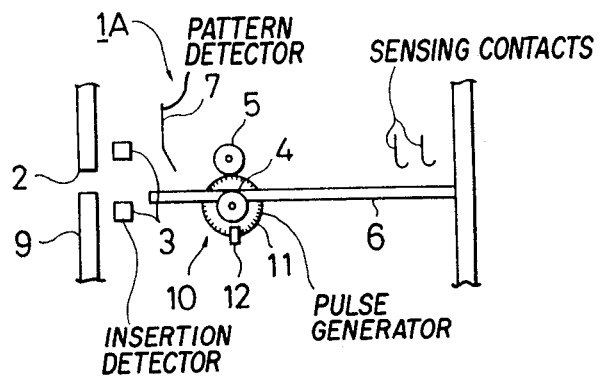
FIG. 1 is a schematic side view showing a major portion of a card identifying apparatus for carrying out a card identifying method according to a first exemplary embodiment of the present invention.
Figure 2:
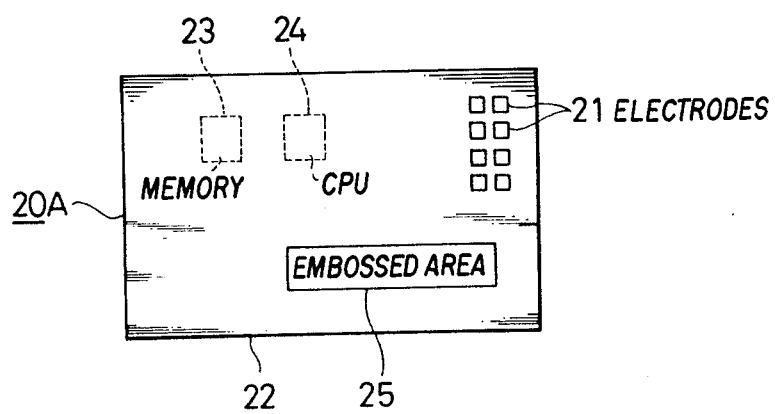
FIG. 2 is a top plan view of a card employed in the card identifying apparatus according to the first embodiment of the invention.

FIG. 1 shows in a schematic side view a main portion of a card discriminating or identifying apparatus for carrying out the card discriminating or identifying method according to a first embodiment of the present invention, and FIG. 2 is a top plan view of a card employed in the card identifying apparatus.

The card identifying apparatus 1A shown in FIG. 1 is destined to be installed in the interior of an automatic cash dispenser and includes a card insertion port 2, an insertion detector 3, rollers 4 and 5, a lower guide plate 6, an embossed pattern detector 7, reading or sensing contacts 8 and a pulse generator 10. The card insertion or loading port 2 is constituted by an elongated slot formed transversely in a customer reception panel 9. The insertion detector 3 is disposed behind the insertion port 2 as viewed in the card transporting direction within the card identifying apparatus 1A.

The insertion detector 3 may be composed of a switch such as an optical switch, by way of example, and serves to detect the insertion of a card 20A (refer to FIG. 2) loaded through the card loading or insertion port 2. The lower guide plate 6 is disposed behind and in succession to the card insertion detector 3 as viewed in the card transporting direction. The lower guide plate 6 is so positioned that the top surface thereof is horizontally flush with the card insertion port 2 or slightly lower than the latter. The roller 4 is rotatably mounted on the lower guide plate 6 at a portion thereof located in the vicinity of the card insertion detector 3.

The roller 4 is so disposed that the top peripheral portion thereof projects slightly beyond the upper surface of the lower guide plate 6 and has a shaft connected to the pulse generator mentioned above. The roller 5 is disposed above the roller 4.

The roller 5 is operated to press from above the card 20A resting on the guide plate 6 against the roller 4. Due to this pressing action of the roller 5, there can be established a definite correspondence between the displacement (magnitude of movement) of the card 20A being inserted and magnitude of rotation of the roller 4.

The pulse generator 10 includes a slit disc 11 fixedly mounted on the shaft of the roller 4, and a slit sensor 12 disposed at a location in the vicinity of the peripheral portion of the slit disc 11. The slit sensor 12 serves to detect the rotation of the slit disc 11 to generate a number of pulses which corresponds to the displacement of the inserted card 20A.

The embossment sensor or detector 7 is disposed between the roller 5 and the insertion detector 3 and adapted to contact with the upper surface of the card 20A disposed on the lower guide plate 6 to detect or sense the embossed area 25 (FIG. 2) for thereby producing a signal representative of the result of detection.

The reading contacts 8 are disposed downstream of the roller 5 as viewed in the card transportation direction and adapted to contact with electrodes 21 (refer to FIG. 2) provided on the upper surface of the card 20A disposed on the lower guide plate 6 for thereby reading out information or data stored in the card 20A.

On the other hand, the card 20A to be used in the card identifying apparatus 1A is composed of a base plate 22 formed of plastic or the like material, a memory 23 and a CPU (Central Processing Unit) 24 both incorporated in the base plate 22, the electrodes 21 provided on the upper surface of the base plate 22, and the embossed area (also referred to simply as embossment) 25. This card 20A is a sort of the so-called IC card. The embossment 25 and the electrodes 21 are so positioned that in the course of the card 20A being inserted into the card identifying apparatus 1, the embossed area or embossment 25 is brought into contact with the embossment sensor 7, while upon complete insertion of the card within the card identifying apparatus 1A, the electrodes 21 are brought into contact with the reading contacts 8. It should be mentioned that the memory 23 is previously loaded with pattern data corresponding to the pattern defined by the embossment.

Figure 3:
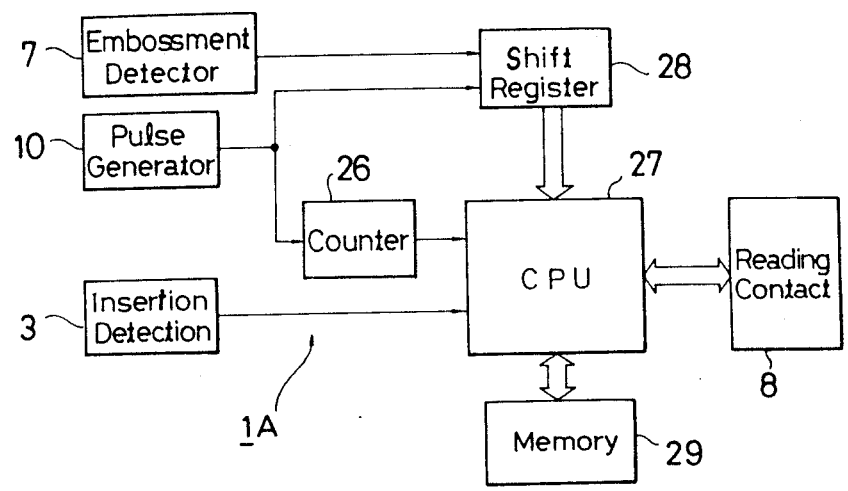
FIG. 3 is a view showing in a block diagram a circuit arrangement employed in the card identifying apparatus shown in FIG. 1.

FIG. 3 is a block diagram showing a general circuit arrangement of the card identifying apparatus 1A according to the first embodiment of the present invention. This circuit operates to read out identification data (pattern data) from the memory 23 incorporated in the card 20A upon insertion thereof within the card identifying apparatus and determine that the inserted card is the authorized one when the identification data read out from the memory 23 coincides with the information (pattern) carried by the embossed area 25 formed in the card 20A and read by the embossment detector 7. This circuit is composed of the embossment detector 7, the reading contacts 8, the insertion detector 3, the pulse generator 10, a counter 26, the CPU 27, a shift register 28 and a memory 29.

The counter 26 is constituted by an n-increment counter to count the pulses produced by the pulse generator 10 and output a pulse signal when the count value has attained a predetermined value, the output pulse signal being supplied to the CPU 27.

The shift register 28 fetches the output data of the embossment detector 7 every time the pulse generator 10 produces the output pulse signal to convert the fetched data into parallel data through sequential shifting operation, the resulting parallel data being supplied to the CPU 27.

The memory device 29 is constituted by a ROM (Read-Only Memory) for storing a program for the CPU 27 and various constant data and a RAM (Random Access Memory) serving as the work area for the CPU and for other purpose.

Figure 4:
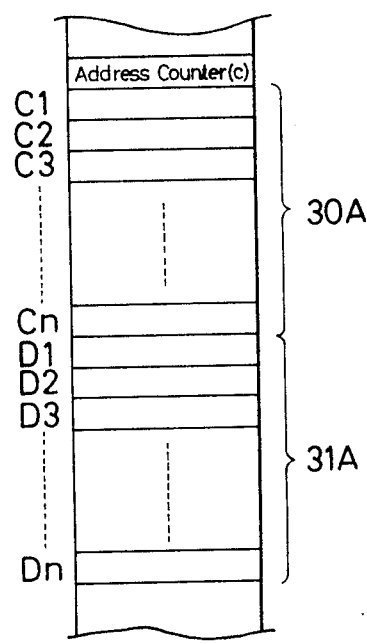
FIG. 4 is a view showing a memory map of the memory shown in FIG. 3.

As will be seen from a memory map shown in FIG. 4, the RAM includes a sensed or detected pattern area 30A in which the parallel data (pattern data) supplied from the shift register 28 is stored and a set pattern area 31A where the identification pattern (pattern data) read out from the memory 23 incorporated in the card 20A is set, and an address counter designating the addresses from which data is to be read out or in which data is to be written.

Figure 5:
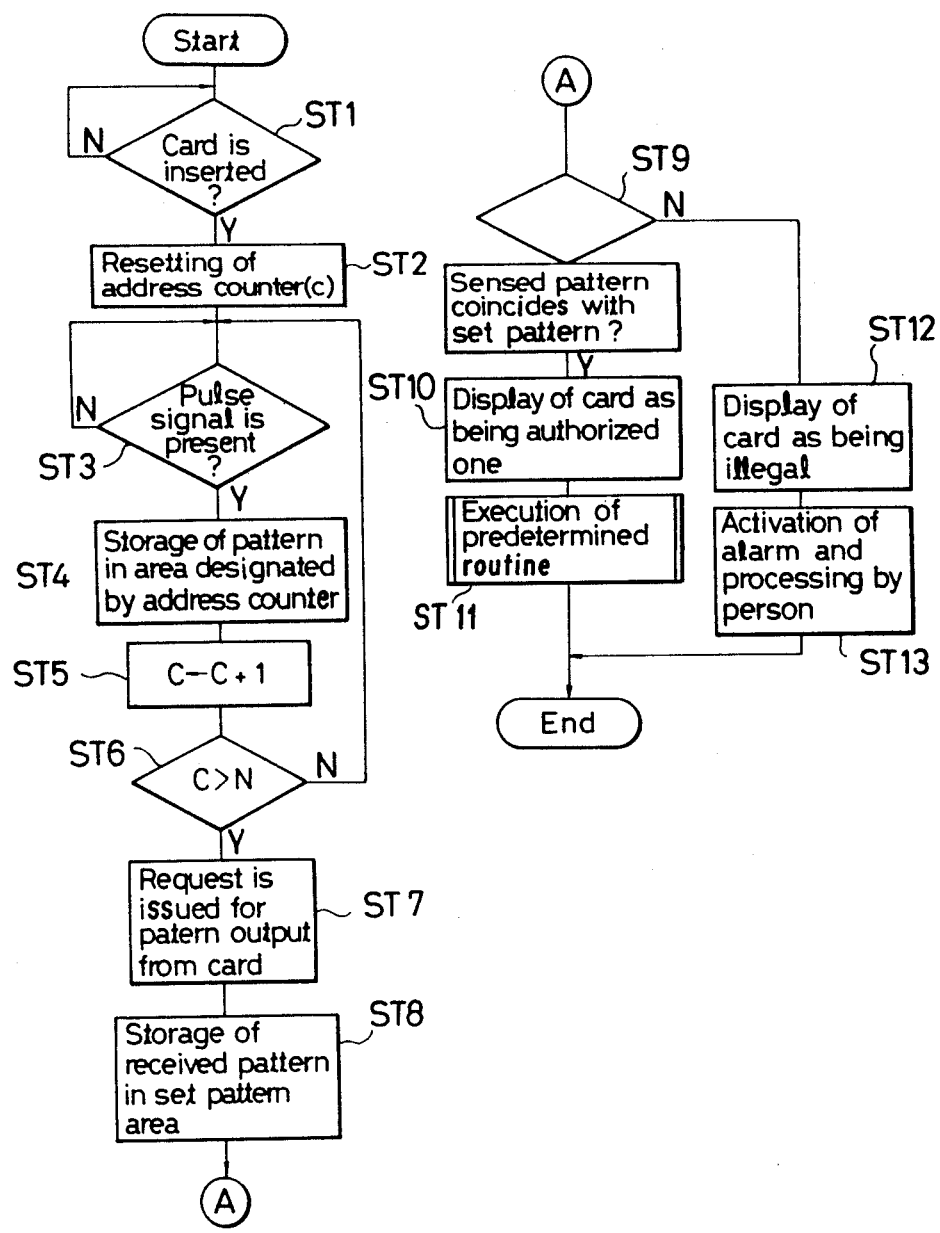
FIG. 5 is a view showing a flow chart for illustrating operation of the card identifying apparatus according to the first embodiment of the invention.

The CPU 27 is composed of a microprocessor and a various interfaces and performs operations mentioned below by referring to a flow chart shown in FIG. 5.

Before the card 20A is loaded or inserted into the card identifying apparatus 1A, the CPU 27 is in the stand-by state awaiting the insertion of the card 20A as indicated at a step ST1.

Upon insertion of the card 20A, the CPU 27 sets the start address of the sensed pattern area 30A as the value C designating the address where data is to be written at a step ST2 and waits for the supply of pulse signal from the counter 26 at a step ST3. Upon being supplied with the pulse signal from the counter 26, the CPU 27 fetches the parallel data from the shift register 28 at a step ST4 to store the data in the memory 29 at the address designated by the address counter mentioned above.

Subsequently, the CPU 27 increments the value C of the aforementioned address counter at a step ST5 and checks whether or not the value C of the address counter has attained a value N indicative of the final or end address of the sensed pattern area 30A at a step ST6. The routine from the step ST3 to the step ST6 is repeated until the value C coincides with the value N. Upon coincidence being found between these values, the program being executed by the CPU 27 branches from the step ST6 to a step ST7 where the CPU issues a signal requesting for the supply of the characteristic or identification data to the card 20A through the contacts 8, being followed by a step ST8 where the identification data is fetched to be written in the memory 29 at the set pattern area 31A.

Subsequently, the CPU 27 makes decision at a step ST9 as to whether the identification data placed in the set pattern area 31A coincides with the pattern data stored in the sensed pattern area 30A. When coincidence is found, the card 20A is determined to be an authorized one, to thereby allow a display unit (not shown) to indicate that the inserted card is the authorized one at a step ST10.

Subsequently, the CPU 27 executes a predetermined routine for cash dispensing operation at a step ST11. The whole processing comes to an end.

On the other hand, when the decision made at the step ST9 results in that the identification data placed in the set pattern area 31A does not coincide with the pattern data stored in the sensed pattern area 30A, it is determined that the card 20A is an illegal or an unauthorized one to thereby cause the display unit to indicate this fact at a step ST12. Subsequently, the CPU 27 activates an alarm (not shown) to inform an operator in charge of this fact through the medium of sound alarm for allowing him or her to take appropriate countermeasures. The processing then come to an end.

As will be appreciated from the foregoing description, by virtue of the feature that the card 20A is provided with the embossment (embossed area (25 which cannot be electrically copied, any counterfeit card which carries only the copied data of the memory 23 is rejected as the unauthorized or illegal card.

Further, due to such arrangement that the memory 23 integrally incorporated in the card 20A is previously stored with the identification data which is also represented by the embossed pattern 25 formed in the upper surface of the card 20A and that upon insertion of the card 20A the identification data stored in the memory 23 is read out to determine that the inserted card 20A is the authorized one upon coincidence being found between the identification data stored in the memory 23 and the embossed pattern data, the authorized card can be readily discriminated from a copied card possibly prepared by data transfer from the authorized card with the aid of a card reader, a card writer and/or other means.

Figure 6:
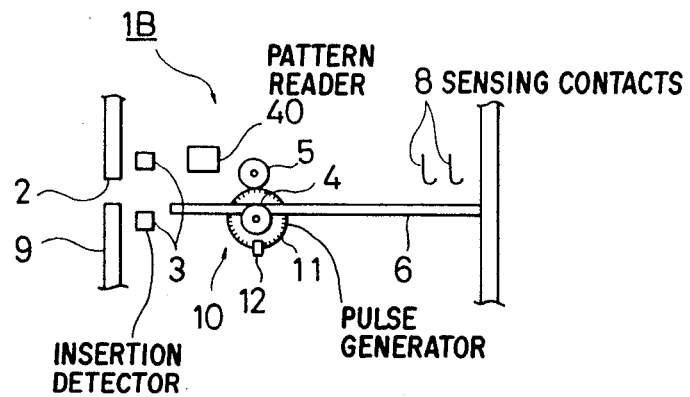
FIG. 6 is a schematic side view showing a major portion of the card identifying apparatus for carrying out the card identification method according to a second exemplary embodiment of the present invention.

FIG. 6 shows in a schematic side view a main portion of a card identifying apparatus according to a second embodiment of the present invention. In this figure, parts corresponding to those shown in FIG. 1 are denoted by same reference numerals.

The card identifying apparatus shown in FIG. 6 and generally denoted by 1B differs from the one 1A shown in FIG. 1 in respect that a pattern reader 40 is provided in place of the embossment detector 7.

Figure 7:
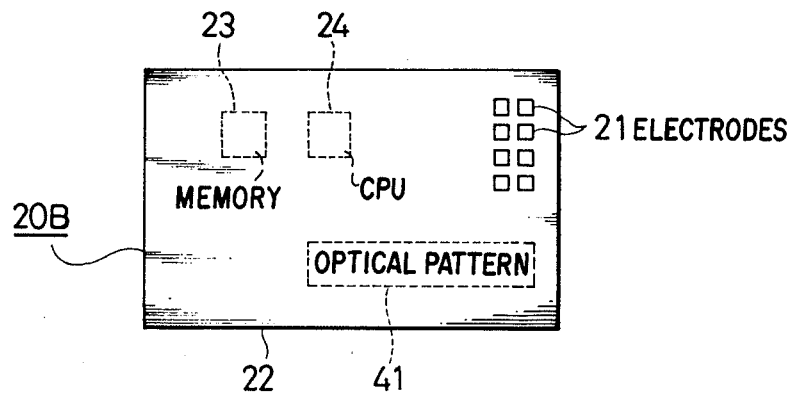
FIG. 7 is a top plan view of a card employed in the card identifying apparatus shown in FIG. 6.

FIG. 7 shows in a top plan view a card destined to be used in combination with the card identifying apparatus 1B. In FIG. 7, parts corresponding to those shown in FIG. 2 are denoted by same reference symbols. As will be seen in FIG. 7, the card 20B differs from the one (20A) shown in FIG. 2 in that a pattern 41 capable of being optically read is provided, for example, by printing in place of the embossed area 25 of the card 20A.

With the arrangement described above, identification information represented by the pattern 41 is stored in the memory 23 integrally incorporated in the card 20B. Upon insertion of the card 20B in the card identifying apparatus 1B, the pattern 41 is read by the pattern reader 40, wherein the result of the reading is compared with the identification information of the pattern 41 stored in the memory 23, whereby it is determined whether the card 20B is a copied one or not.

Figure 8:
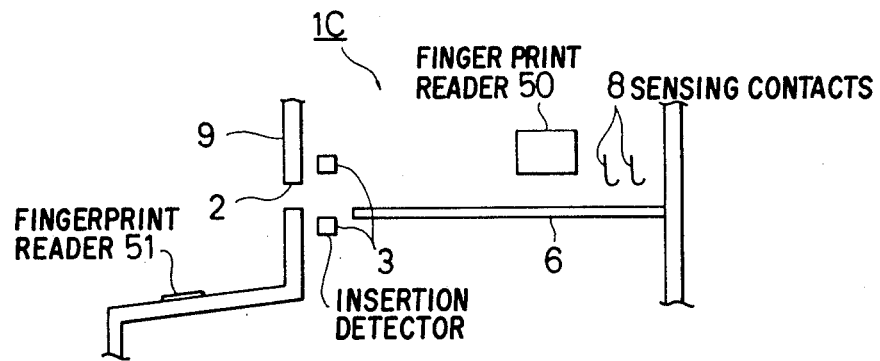
FIG. 8 is a schematic side view showing a major portion of the card identifying apparatus for carrying out the card identification method according to a third exemplary embodiment of the present invention.

FIG. 8 is a schematic side view showing a major portion of the card identifying apparatus according to a third embodiment of the present invention. In FIG. 8, parts corresponding to those shown in FIG. 1 are denoted by same reference numerals. The card identifying apparatus shown in FIG. 8 and generally denoted by a reference symbol 1C differs from the one (1A) shown in FIG. 1 in respect that the embossment sensor or detector 7, the rollers 4 and 5 and the pulse generator 10 are spared and instead of them, fingerprint readers 50 and 51 are provided above the lower guide plate 6 and on the customer reception panel 9, respectively.

Figure 9:
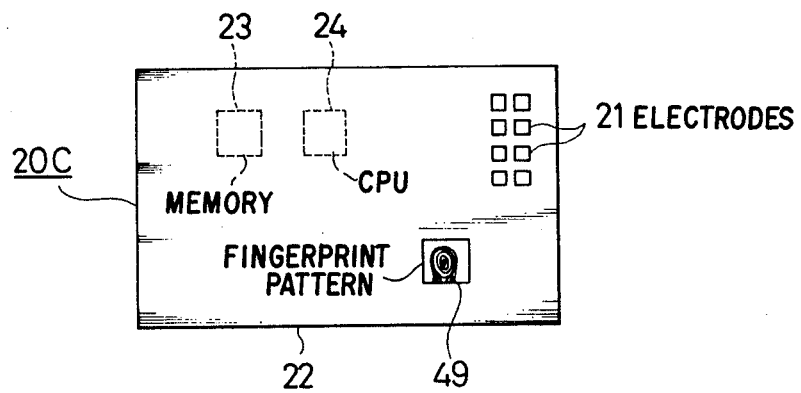
FIG. 9 is a top plan view showing a card employed in the card identifying apparatus shown in FIG. 8.

FIG. 9 shows in a top plan view a card destined to be used in the card identifying apparatus shown in FIG. 8. Also in FIG. 9, parts corresponding to those shown in FIG. 2 are denoted by like reference symbols. Difference of the card 20C shown in FIG. 9 from the one (20A) shown in FIG. 2 can be seen in that a fingerprint pattern 49 of the authorized user or holder of this card 20C is provided by printing or the like method instead of the embossed area 25 and that information representative of the fingerprint pattern 49 is stored in the memory 23 integrally incorporated in the card 20C.

Figure 10:
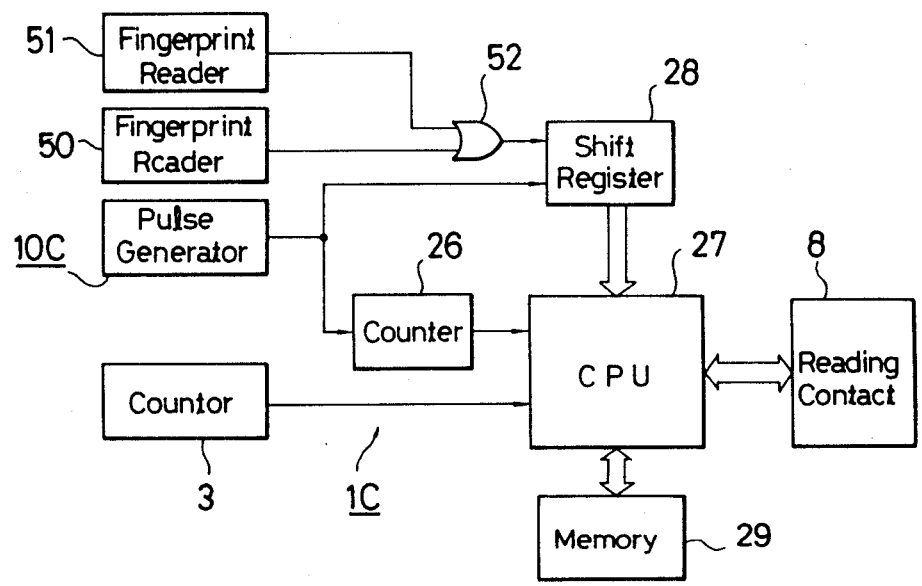
FIG. 10 is a view showing in a block diagram a circuit arrangement employed in the card identifying apparatus shown in FIG. 8.

FIG. 10 is a block diagram showing a circuit arrangement employed in the card identifying apparatus 1C according to the third embodiment of the present invention. In FIG. 10, parts corresponding to those shown in FIG. 3 are denoted by like reference symbols.

Figure 11:
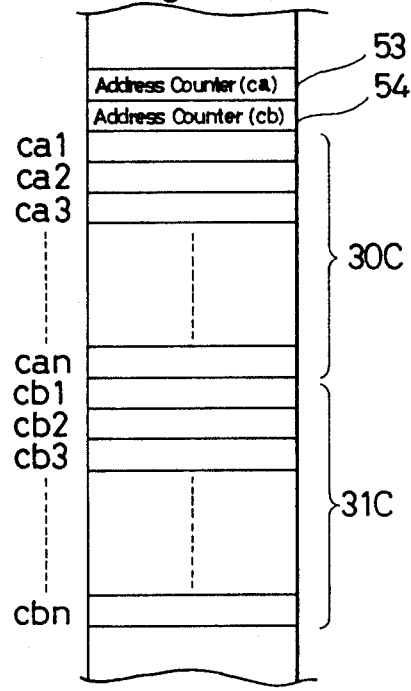
FIG. 11 is a view showing a memory map of the memory shown in FIG. 10.

The circuit arrangement shown in FIG. 10 differs from the one shown in FIG. 3 in that the output signals produced by the fingerprint readers 50 and 51 which replace the embossment detector 7 shown in FIG. 3 are supplied to the shift register 28 through an OR-gate 52 and that a RAM constituting the memory 29 includes as parts there of a sensed pattern area 30C where the parallel data (pattern data) supplied from the shift register is stored and a set pattern area 31C where identification data (pattern data) read out from the memory 23 of the card 20C is placed, as can be seen in the memory map shown in FIG. 11. Additionally, address counters 53 and 54 are provided in conjunction with reading or writing operation relative to the sensed pattern area 30C and 31C.

Further, in the case of the instant embodiment, a pulse generator 10C is driven under the control of the CPU 27, the output pulse signal of the pulse generator 10C being supplied to the counter 26 and the shift register 28.

Figures 1, 12:
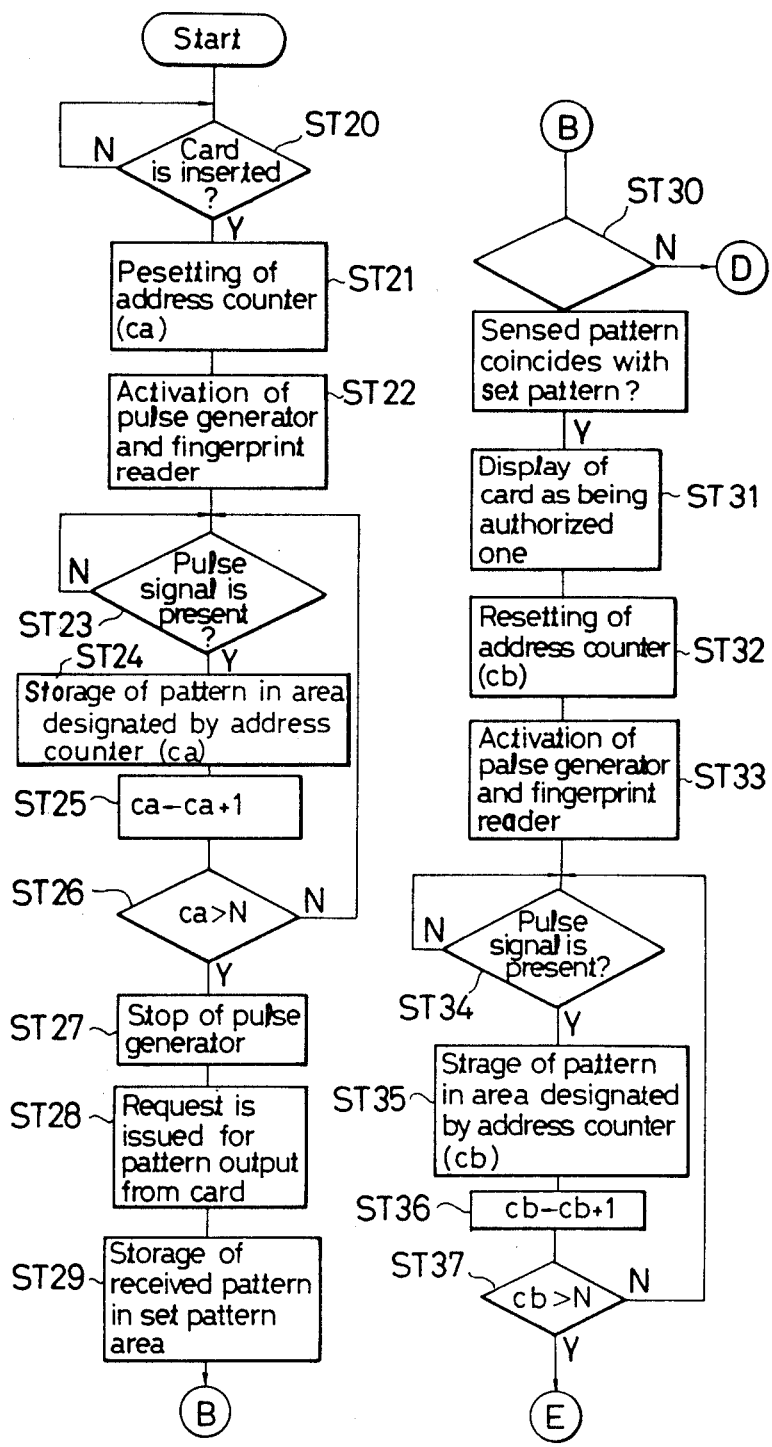
Figures 2, 12:
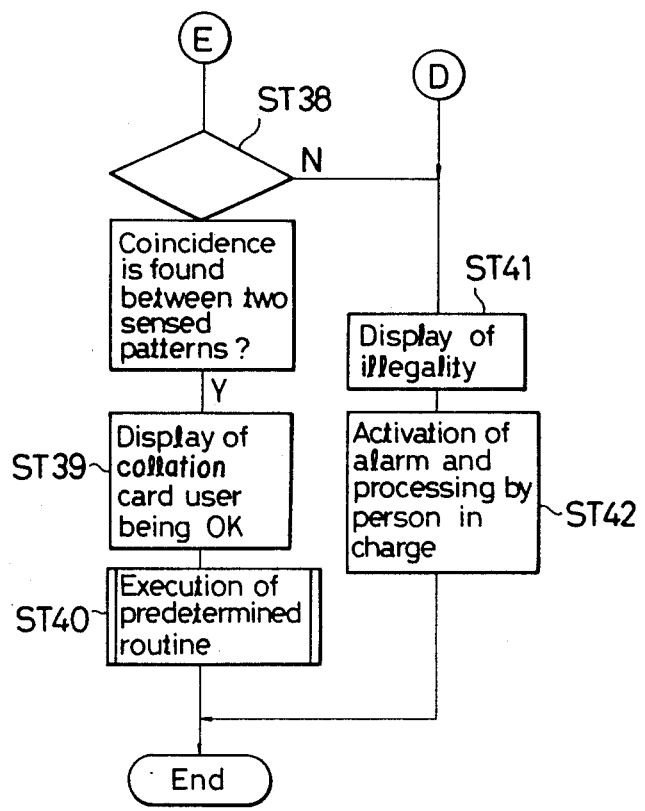

Next, operation of the card identifying apparatus according to the instant embodiment will be described by referring to a flow chart shown in FIG. 12.

At first, before the card 20C is inserted into the card identifying apparatus 1C, the CPU 27 waits for the insertion of the card 20C as indicated at a step ST20. Upon insertion of the card 20C, the CPU 27 places the start address of the sensed pattern area 30C in the address counter 53 serving to designate the address where data is to be written (step ST21). Thereafter, the CPU 27 allows the pulse generator 10C and the fingerprint reader 50 to start the respective operations at a step ST22. Subsequently, the CPU 27 waits for the supply of the pulse signal from the counter 26 at a step ST23.

In response to the reception of the pulse signal, the CPU 27 fetches the parallel data from the shift register 28 and stores the data in the memory 29 at the address designated by the value ca of the address counter 53 at a step ST24.

Next, at a step ST25, the CPU 27 increments the value ca of the address counter 53, being followed by a step ST26 where it is checked whether the value ca of the address counter 53 has attained the end or final address of the sensed pattern area 30A. The routine including the steps ST23 to ST26 is repeated until coincidence is detected between the value ca and the final address of the sensed pattern area 30C. Upon coincidence being detected, processing performed by CPU 27 branches to a step ST27 from the step ST26, whereupon the pulse generator 10C is stopped.

Subsequently, the CPU 27 issues a request for the supply of identification data from the card 20C through the reading contacts 8 at a step ST28 and fetches the data to be written in the set pattern area 31C of the memory 29 at a step ST29.

Next, the CPU 27 makes decision as to whether or not the identification data stored in the set pattern area 31C coincides with the pattern data stored in the sensed pattern area 30C at a step ST30. When the coincidence is found, it is decided that the inserted card is the authorized one, resulting in that the display (not shown) produces information indicating the legality of the card 20C at a step ST31.

Now, the CPU 27 produces a prompting message such as, for example, "Please put finger on fingerprint reader" on the display. When the card holder puts his or her finger on the fingerprint reader 51, the CPU 27 places the start address of the set pattern area 31C in the address counter 54 indicating the address where data is to be written at a step ST32. Next, the CPU 27 starts the operation of the pulse generator 10C and the fingerprint reader 51 at a step ST33 and waits for the supply of the pulse signal from the counter 26 at a step ST34. In response to the supply of the pulse signal, the CPU 27 fetches the parallel data from the shift register 28 and stores the data in the memory 29 at the address designated by the value cb of the address counter 54 at a step ST35.

After the value cb of the address counter 54 is incremented at a step ST36, the CPU 27 makes decision as to whether the value cb of the address counter 54 has attained the value N of the final address of the set pattern area 31C, as indicated by a step ST37. The routine including the steps ST34 to ST37 is repeated until coincidence has been detected between the values cb and N.

Upon coincidence being found, the CPU 27 stops the pulse generator 10C, and the processing branches from the step ST37 to a step ST38 where decision is made as to whether the pattern data stored in the set pattern area 31C coincides with the pattern data placed in the sensed pattern area 30C.

When both data coincide with each other, the CPU 27 determines that the holder of the card 20C is an authorized person to thereby cause the display to produce a message "Collation of card holder has proved OK" at a step ST39.

Finally, the CPU 27 executes a predetermined routine for dispensing paper currency. Operation then comes to an end.

On the other hand, when it was found at the steps ST30 and 38 that pattern data stored in the pattern data area 31C does not coincide with the pattern data placed in the sensed pattern area 30C, it is determined that the holder of the inserted card 20C is an unauthorized person, as a result of which a message informing the illegality of the card or user is produced on the display at a step ST41.

Subsequently, the CPU 27 triggers operation of the alarm (not shown) to inform an operator in charge of the above fact to allow him or her to take appropriate countermeasures against the illegal use of the card 20C.

As will be appreciated from the foregoing description, with the card identifying apparatus according to the instant embodiment, the genuineness or spuriousness of the card 20C is discriminated, which is additionally followed by the decision as to whether the user or holder of this card is an authorized person or not, whereby the use of the card 20C by the unauthorized person is positively prohibited.

Although it has been described above in conjunction with the third embodiment that the genuineness of the card 20C and the card user is discriminatively determined on the basis of the fingerprint, it should be appreciated that such determination may be made on the basis of signature hand-written by the card holder or user.

In the case of the various embodiments of the invention, the genuineness or spuriousness of the card is discriminatively determined on the side of the card identifying apparatus. However, such arrangement is also possible in which the genuineness or spuriousness of the card is determined on the side of the card.

Figure 13:
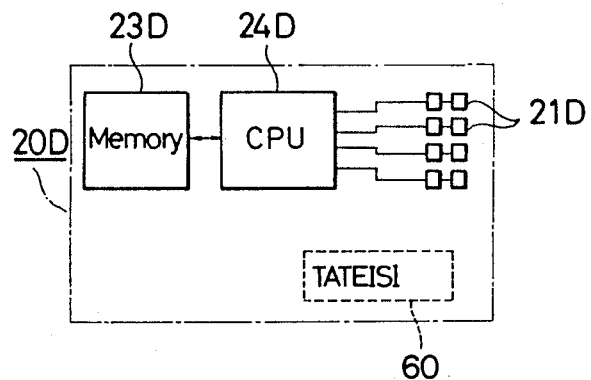
FIG. 13 is a view showing in a block diagram a circuit arrangement incorporated in a card employed in carrying out the card identifying method according to a fourth embodiment of the present invention.

FIG. 13 is a block diagram showing a circuit arrangement provided on the side of the card for determining the genuineness or spuriousness of the card according to another embodiment of the present invention.

The circuit shown in FIG. 13 is incorporated in a card 20D provided with a pattern 60 such as an embossed pattern, a character pattern or the like and composed of electrodes 21D exposed externally from a surface of the card 20D, a CPU 24D for performing transaction of data with external apparatus by way of the electrodes 21D, and a memory 23D controlled by the CPU 24D.

Figure 14:
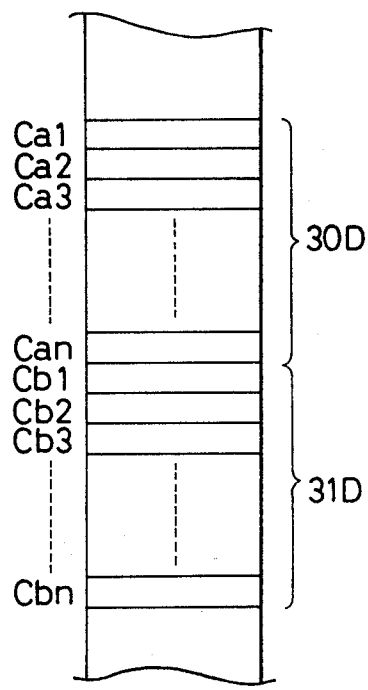
FIG. 14 is a view showing a memory map of the memory shown in FIG. 13.

The memory 23D includes as parts thereof a ROM for storing a program for the CPU 24D and a variety of constant data and a RAM serving as the work area for the CPU 24D. As will be seen from a memory map shown in FIG. 14, the RAM includes a sensed or detected pattern area 30D in which the data (pattern data) supplied through the electrodes 21D is stored, and an address counter, while the ROM includes as a part thereof a set pattern area 31D for storing the characteristic information (pattern data) characteristic of the pattern 60 of the card 20D.

Figure 15:
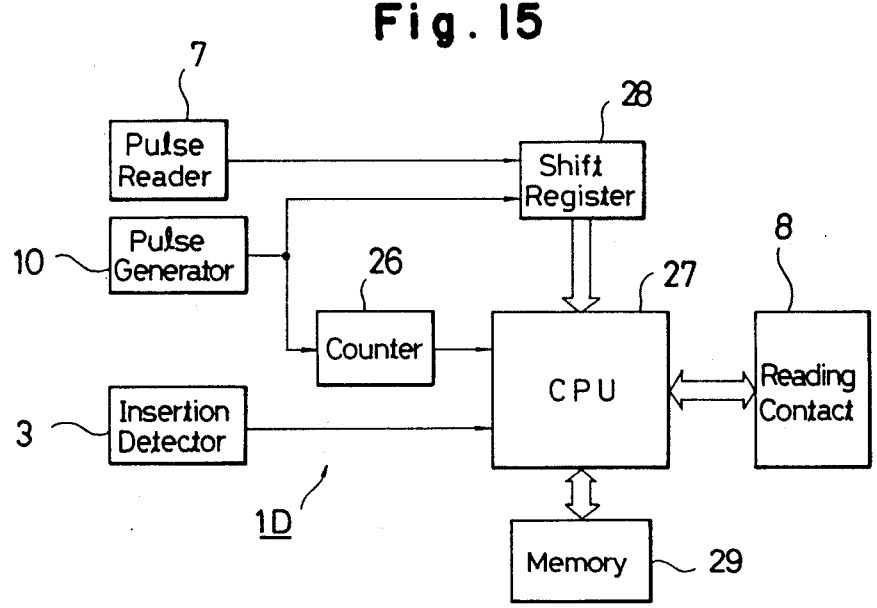
FIG. 15 is a view showing in a block diagram a circuit arrangement realized in a card identifying apparatus according to the fifth embodiment of the present invention.

FIG. 15 is a block diagram showing an exemplary circuit arrangement of the card identifying apparatus 1D according to the fourth embodiment. In FIG. 15, parts corresponding to those shown in FIG. 3 are denoted by like reference symbols.

Figure 16:
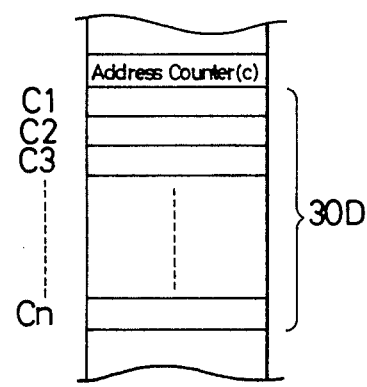
FIG. 16 is a view showing a memory map of the memory shown in FIG. 15.

The instant circuit arrangement differs from the one shown in FIG. 3 in that the memory 29 includes only the sensed pattern area 30, as is illustrated in FIG. 16.

In the case of the instant embodiment, the CPU 27 performs the operation mentioned below.

Figures 1, 17:
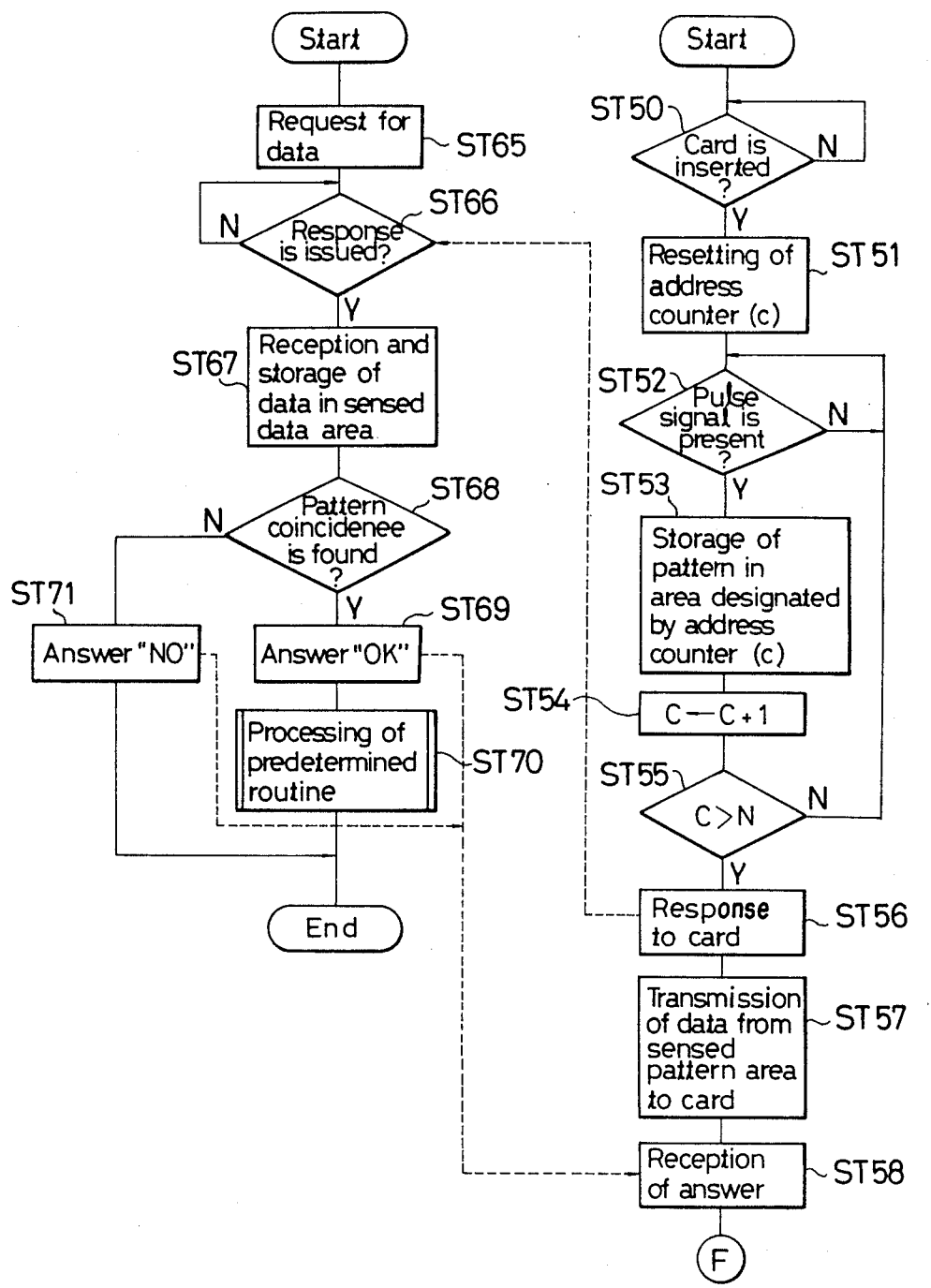
Figures 2, 17:
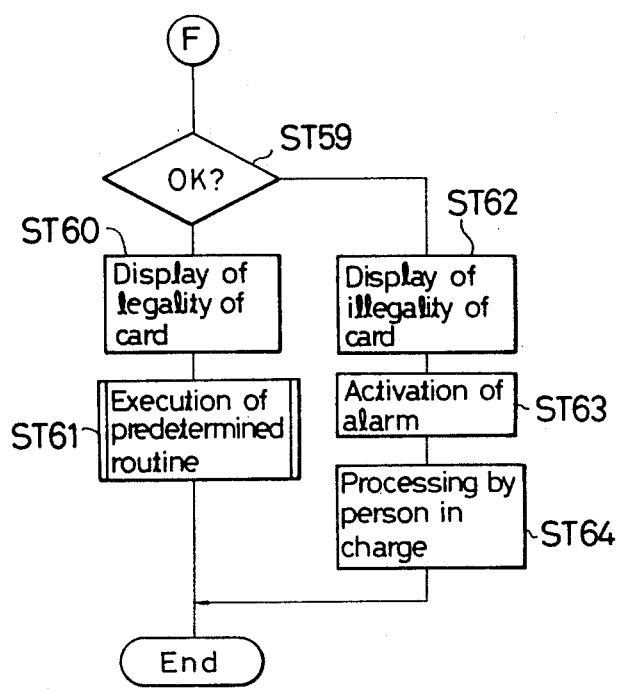

Before the card 20C is inserted into the card identifying apparatus 1D, the CPU 27 waits for the loading of the card 20D as indicated at a step ST50 in FIG. 17. Upon insertion of the card 20D, the CPU 27 sets the value C of the address counter designating the address where data is to be written to the value indicative of the start address of the sensed pattern area 30D at a step ST51 and thereafter awaits the supply of the pulse signal from the counter 26. When the pulse signal is supplied, the CPU 27 fetches the data (parallel data) resulting from the reading of the pattern 60 of the card 20D outputted from the shift register 28 at a step ST53, the data being stored in the memory 29 at the address designated by the value C of the address counter.

Subsequently, the CPU 27 increments the value C of the address counter at a step ST54 and the checks whether the value C of the address counter has attained the value indicative of the final address of the sensed pattern area 30 at a step ST55. Unless coincidence is detected, the routine including the steps ST52 to ST55 is executed repeatedly until the coincidence mentioned above is detected.

Upon coincidence being found, the procedure executed by the CPU 27 branches from the step ST55 to a step ST56 where information indicating the capability of transmission of the sensed data to the card 20D is issued. At a step ST57, the sensed data is transferred from the sensed pattern area 30D to the card 20D to determine whether the sensed data is legal or illegal.

Subsequently, the CPU 27 receives the result of the determination from the card 20D at a step ST58 and checks whether the result of identification or determination indicates "OK" at a step ST59. If so, the CPU 27 decides that the card 20D is an authorized or legal one to cause the display (not shown) to indicate this fact at a step ST60. Finally, the CPU 27 executes a predetermined routine for the currency dispensing operation or the like at a step ST61.

On the other hand, when the result of decision transmitted from the card 20D indicates "NO", the program executed by the CPU 27 branches from the step ST59 to a step ST62 where the display produces a message that the card is an unauthorized one. Subsequently, the CPU 27 activates an alarm (not shown) at a step ST63 to inform an operator in charge of the illegality of the card at a step ST63, being followed by the final step ST64 where the operator in charge can take any appropriate countermeasures.

The card 20D inserted in the card identifying apparatus 1D performs operation mentioned below.

At first, when the card 20D is loaded in the card identifying apparatus 1D, the CPU 24 provided in the card 20D executes a step ST65 to issue a request for the transfer of the sensed data to the card identifying apparatus. At a step ST66, the CPU 24 waits for the response from the card identifying apparatus 1D.

Upon response from the card identifying apparatus 1D, the CPU 24 writes the sensed data transferred from the card identifying apparatus 1D into the memory 23D at the sensed pattern area 30D at a step ST67.

Next, the CPU 24 makes decision as to whether or not the identification data stored in the set pattern area 31D coincides with the sensed data stored in the sensed pattern area 30D at a step ST68. When coincidence is found, the genuineness of the card 20D is ascertained, whereupon an answer message "OK" is sent to the card identifying apparatus 1D at a step ST69. Subsequently, a routine for transferring predetermined data to the card identifying apparatus 1D is executed at a step ST70.

On the other hand, unless coincidence is detected between the identification data stored in the set pattern area 31D and the sensed data stored in the sensed pattern area 30D at the step ST68, the CPU 24 sends a message "NO" to the card identifying apparatus 1D at a step ST71, thus informing the fact that the inserted card is an illegal one.

With the arrangement described above, it is possible to discriminatively identify the authorized card from any illegal card which may be prepared by transferring the data from the card 20D to a blank card with the aid of a card reader and/or card writer.

The discriminative identification of other card than the above mentioned card, e.g. a card having a fingerprint can be performed on the side of the card.

Figure 18:
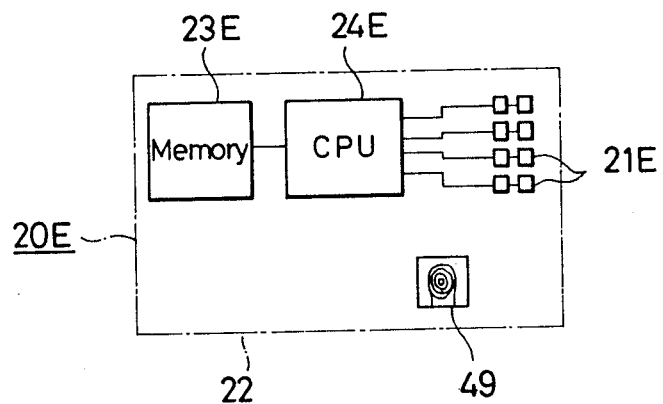
FIG. 18 is a view showing in a block diagram a circuit arrangement incorporated in a card employed in carrying out the card identifying method according to a fifth embodiment of the present invention.

FIG. 18 shows a block diagram an example of a card provided with a fingerprint and adapted to perform the genuineness discrimination of the card on the side of the card itself.

The circuit shown in FIG. 18 is incorporated in a card 20E provided with a fingerprint pattern 49 on a surface thereof and composed of electrodes 21E exposed externally from the surface of the card 20E as in the case of the card 20D, a CPU 24E for performing transaction of data with external apparatus by way of the electrodes 21E, and a memory 23E controlled by the CPU 24E.

Figure 19:
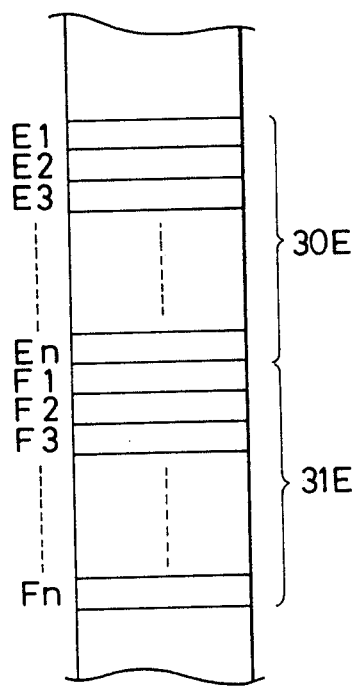
FIG. 19 is a view showing a memory map of the memory shown in FIG. 18.

The memory 23E includes as parts thereof a ROM including a set pattern area 31E for storing identification data (pattern data) characteristic of the fingerprint pattern 49 and a RAM including a sensed pattern area 30E for storing data (pattern data) supplied by way of the electrodes 21E, as will be seen in FIG. 19.

Figure 20:
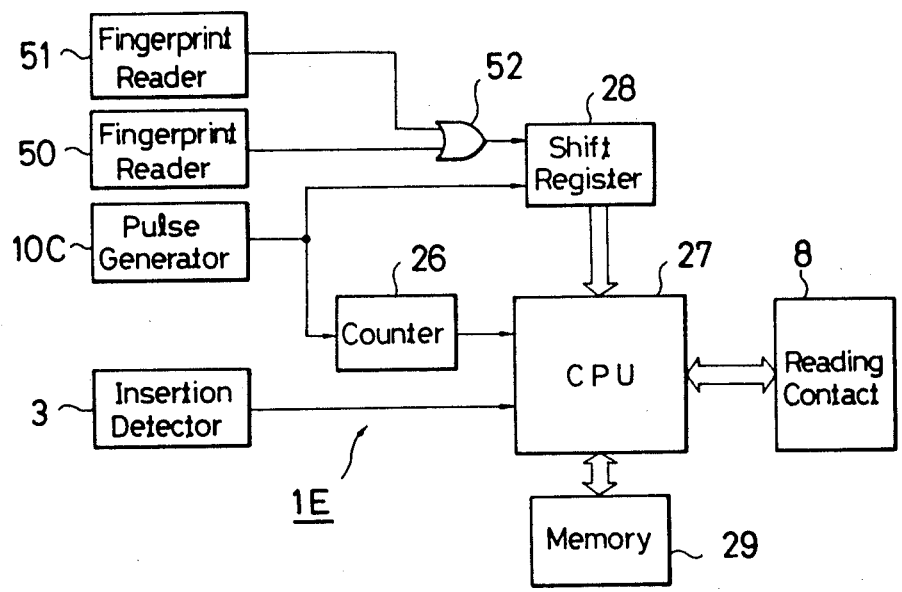
FIG. 20 is a view showing in a block diagram a circuit arrangement realized in a card identifying apparatus according to the fifth embodiment of the present invention.

FIG. 20 is a block diagram showing an exemplary circuit arrangement of the card identifying apparatus 1E according to the fifth embodiment of the invention. In FIG. 20, parts corresponding to those shown in FIG. 10 are denoted by like reference symbols.

Figure 21:
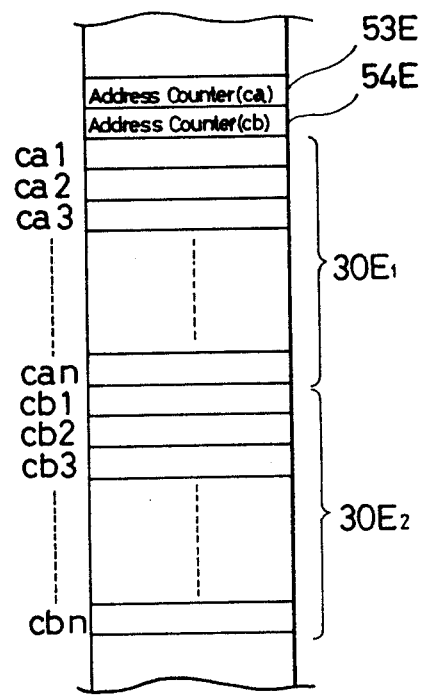
FIG. 21 is a view showing a memory map of the memory shown in FIG. 20.

The instant circuit arrangement differs from the one shown in FIG. 10 in that the memory 29 includes first and second sensed pattern areas $30E_1$ and $30E_2$ and first and second address counters 53E and 54E, as shown in FIG. 21.

In the case of the instant embodiment, the CPU 27 performs the operation mentioned below.

Figures 1, 22:
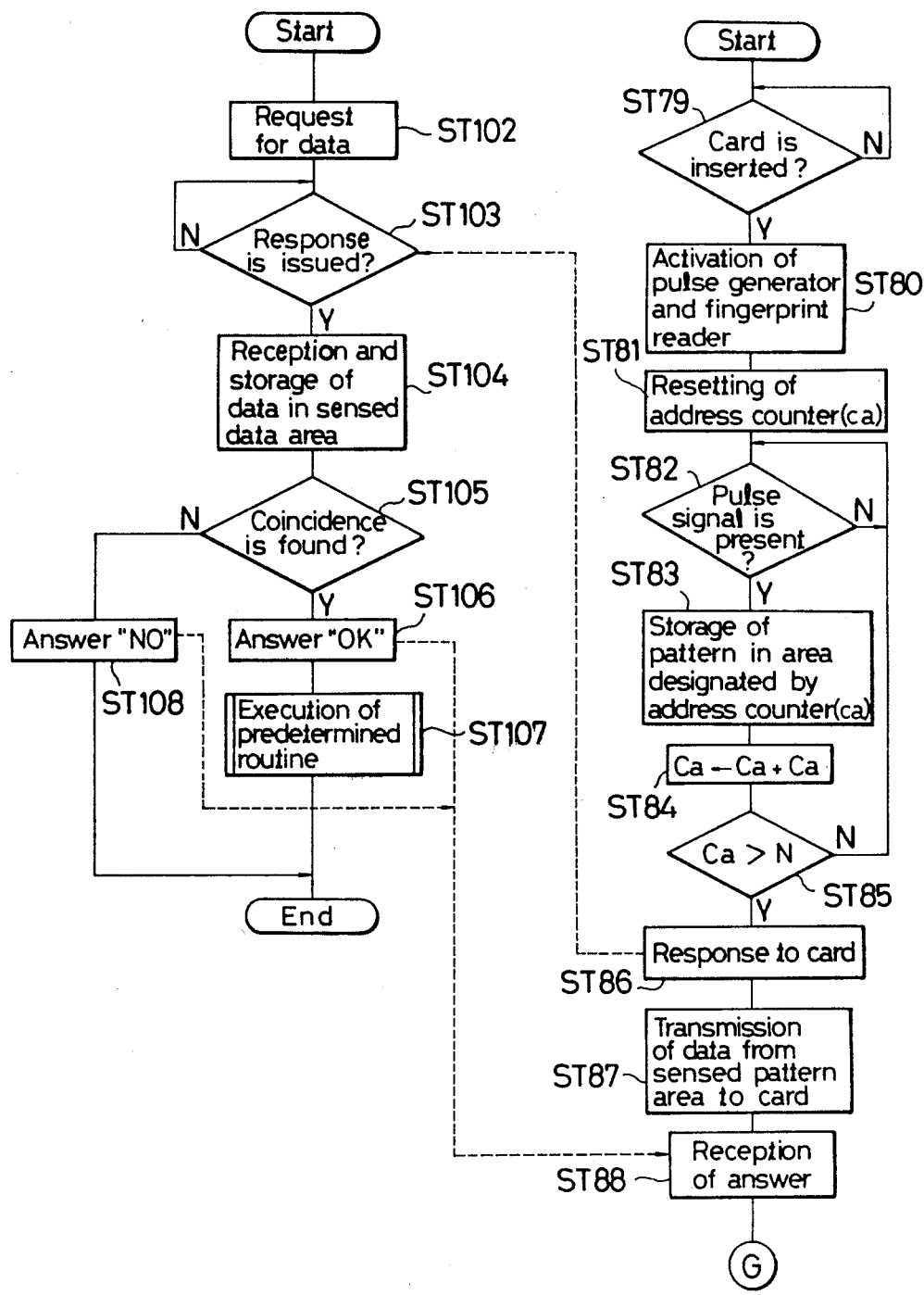
Figures 2, 22:
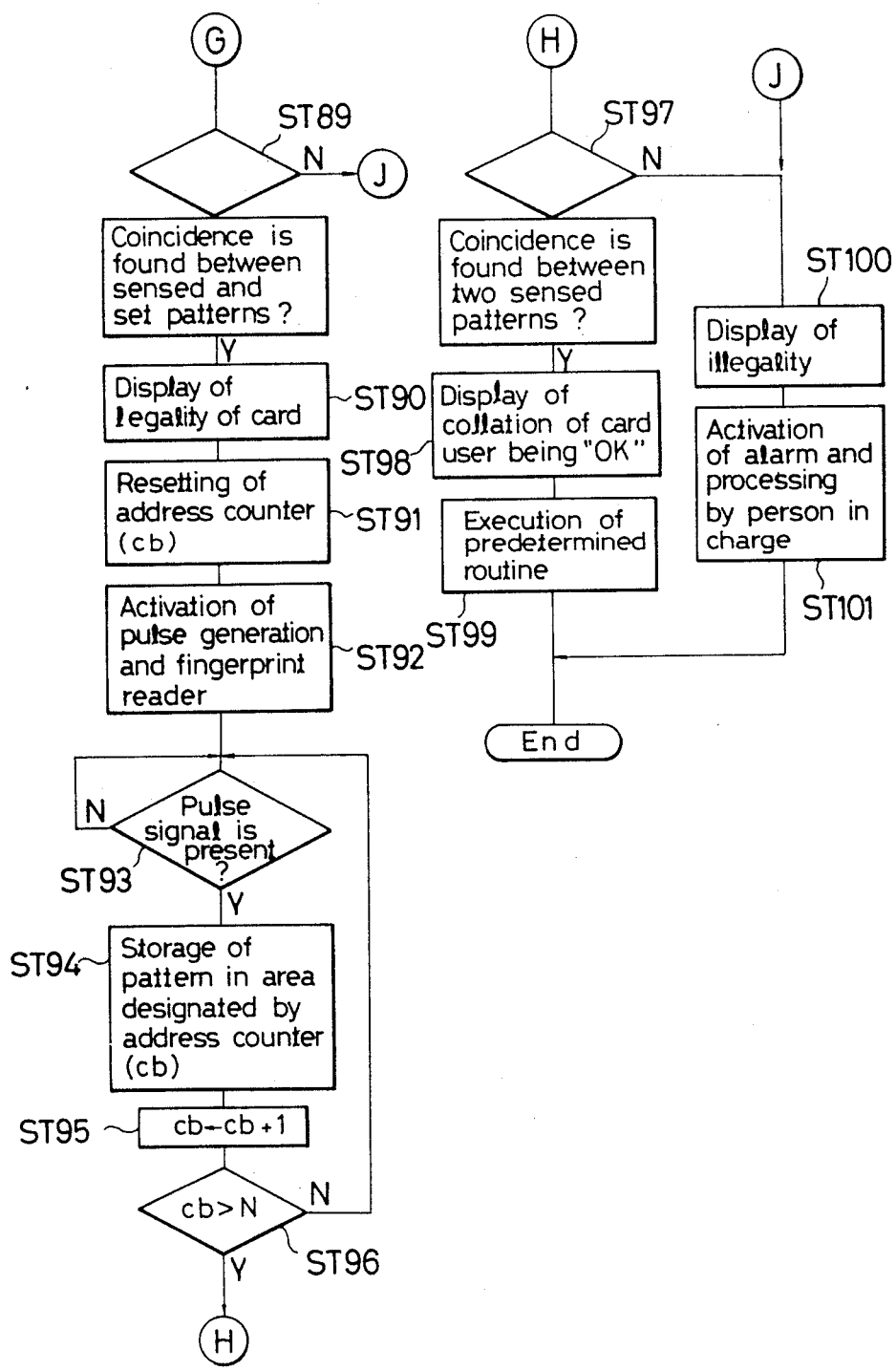

Before the card 20E is inserted into the card identifying apparatus 1E, the CPU 27 waits for the loading of the card 20E as indicated at a step ST79 in FIG. 22. Upon insertion of the card 20E, the CPU 27 activates the pulse generator 10C and the fingerprint reader 50 and at the same time sets the address counter 53E designating the address where data is to be written to the value indicative of the start address ca of the sensed pattern area 30E at a step ST81 and thereafter awaits the supply of the pulse signal from the counter 26. When the pulse signal is supplied, the CPU 27 fetches the data resulting from the reading of the fingerprint pattern 49 of the card 20E by way of the shift register 28 at a step ST83, the data being stored in the memory 29 at the address designated by the value ca of the address counter 53.

Subsequently, the CPU 27 increments the value ca of the address counter 53 at a step ST84 and then checks whether the value ca of the address counter 53E assumes the value indicative of the final address N of the sensed pattern area $30E_1$ at a step ST85. Unless coincidence is detected, the routine including the steps ST82 to ST85 is executed repeatedly until the coincidence mentioned above is detected.

Upon coincidence being found, the program executed by the CPU 27 branches from the step ST85 to a step ST86 where information indicating the capability of transmission of the sensed data to the card 20E is issued. At a step ST87, the sensed data is transferred from the sensed pattern area 30E₁ to the card 20E to determine whether the sensed data is legal or illegal.

Subsequently, the CPU 27 receives the result of the determination from the card 20E at a step ST88 and checks whether the result of identification or determination indicates "OK" at a step ST89. If so, the CPU 27 decides that the card 20E is an authorized or legal one to cause the display (not shown) to indicate this fact at a step ST90.

Next, the CPU 27 causes the display to produce a prompting message such as, for example, "Please put finger on fingerprint reader" or the like at a step ST91. After the holder of the card 20E puts his or her finger on the fingerprint reader 51, the value ca of the address counter 54E indicating the address where data is to be written is set to the start address of the sensed pattern area 30E₂. Subsequently, the CPU 27 starts operation of the fingerprint reader 51 and the pulse generator 10C at a step ST92. Thereafter, the CPU 27 awaits the supply of the pulse signal from the counter at a step ST93.

In response to the supply of the pulse signal, the CPU 27 fetches parallel data from the shift register 28 at a step ST94. At this time, the shift register 28 is placed with the data representative of the fingerprint pattern of the card holder or user as read by the fingerprint reader 51. Accordingly, the CPU 27 is supplied with the fingerprint pattern data, which is then stored in the memory 29 at the address of the memory 29 designated by value cb of the address counter 54E.

Subsequently, the CPU 27 increments the value cb of the address counter 54E at a step ST95 and checks at a step ST96 whether the value cb of the address counter 54E has attained the value N of the final address of the sensed pattern area 30E₂. Unless coincidence is detected between the values cb and N, the routine including the steps ST93 to ST96 is executed until the coincidence is established.

Upon occurrence of the coincidence, the CPU 27 stops the pulse generator 10C, being followed by the branching from the step ST96 to a step ST97 where it is checked whether the pattern data stored in the sensed pattern area 30E₂ is in coincidence with the pattern data stored in the sensed pattern area 30E₁. When coincidence exists, the CPU 27 determines that the holder or user of the card 20E is an authorized person to thereby produce a message "Collation of user has proved OK" or the like on the display at a step ST98.

Subsequently, the CPU 27 executes a predetermined routine for the currency dispensing operation at a step ST99. The execution of the whole program then comes to an end.

On the contrary, when discrepancy is found between the pattern data in concern at the steps ST89 and ST97, the CPU 27 determines that the card 20E is an illegal one or the user of the card is an unauthorized person to cause this fact to be displayed on the display unit at a step ST100. Thereafter, the CPU 27 activates an alarm (not shown) to thereby allow an operator in charge to take appropriate countermeasures at a step ST101. The operation of the CPU 27 is then completed.

The card 20E inserted in the card identifying apparatus 1E performs operation similar to that of the card 20D mentioned hereinbefore.

At first, when the card 20E is loaded in the card identifying apparatus 1E, the CPU 24E provided in the card 20E executes a step ST102 to issue a request for the transfer of the sensed data to the card identifying apparatus 1E. At a step ST103, the CPU 24E waits for the response from the card identifying apparatus 1E.

Upon reception of the response from the card identifying apparatus 1E, the CPU 24E writes the sensed data transferred from the card identifying apparatus 1E into the memory 23E at the sensed pattern area 30E at a step ST104.

Subsequently, the CPU 24E makes decision as to whether or not the identification data stored in the set pattern area 31E coincides with the sensed data stored in the sensed pattern area 30E at a step ST105. When coincidence is found, the genuineness of the card 20E is ascertained, whereupon an answer message "OK" is sent to the card identifying apparatus 1E at a step ST106. Subsequently, a routine for transferring predetermined data to the card identifying apparatus 1E is executed at a step ST107.

On the other hand, unless coincidence is detected between the identification data stored in the set pattern area 31E and the sensed data stored in the sensed pattern area 30E at the step ST106, the CPU 24 sends a message "NO" to the card identifying apparatus 1E at a step ST108, thus informing the fact that the inserted card 20E is an illegal one.

With the arrangement described above, it is possible on the side of the card to discriminatively identify the authorized card from any illegal card, while the card identifying apparatus can check whether the card user is an authorized person or not.

Figure 23A:
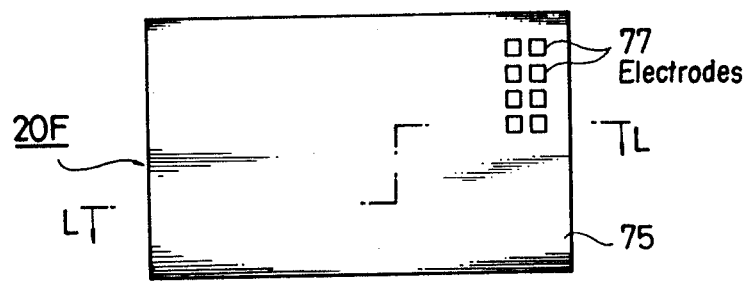
FIG. 23(A) is a top plan view of a card employed in the card identification according to a sixth embodiment of the present invention.
Figure 23B:
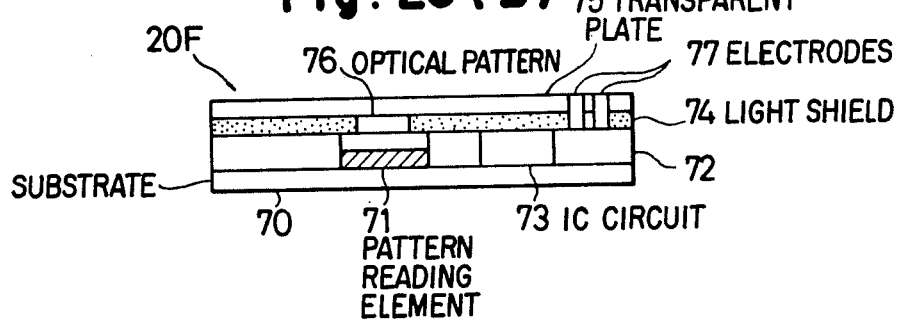
FIG. 23(B) is a sectional view taken along the line L—L in FIG. 23(A)
Figure 24:
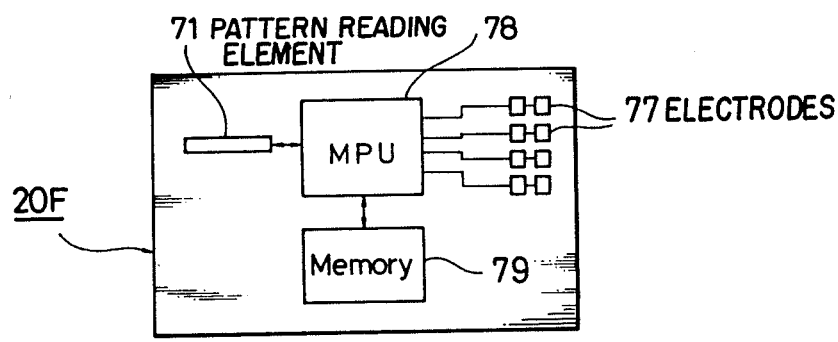
FIG. 24 is a view showing in a block diagram a circuit arrangement incorporated in the card shown in FIGS. 23(A) and 23(B)

FIG. 23(A) shows a plan view of a card employed in the card identifying apparatus according to the sixth embodiment of the present invention, and FIG. 23(B) is a sectional view of the card taken along the like L—L in FIG. 23(A).

Referring to FIGS. 23(A) and 23(B), the card denoted generally by a reference symbol 20F integrally incorporates therein an IC circuit capable of storing more than several thousand characters and additionally means for protecting the card against illegal copying. More specifically, a numeral 70 denotes a substrate, 77 denotes a pattern reading element, 72 denotes a spacer, 73 denotes the IC circuit, 74 denotes a light shield plate, 75 denotes a transparent plate, 76 denotes a paper sheet (carrying optical pattern) and 77 denotes electrodes.

The substrate 70 constitutes a base plate of the card 20F and may be made of a plastic material or the like having the pattern reading element 71 provided on the upper surface thereof. The pattern reading element 71 is constituted by a plurality of photoelectronic elements (such as photodiodes, phototransistors or the like) disposed in a matrix-like arrangement (or in an array-like configuration). Alternatively, the pattern reading element 71 may be constituted by a solid image pick-up element such as CCD. The spacer 72 is disposed so as to enclose the pattern reading element 71.

The spacer 72 is formed of a plastic plate (or other resin plate) having a greater thickness than that of the pattern reading element 71 and provided with recesses for accommodating therein the pattern reading element 71 and the IC circuit 73. The bottom surface of the spacer 72 is fixedly bonded to the upper surface of the substrate 70, while the top surface of the spacer 72 is fixedly bonded to the light shield plate 74.

The light shield plate 74 may be formed of an opaque plastic material, a colored plastic plate or other suitable material. An aperture is formed in the shield plate 74 at a position opposite to the pattern reading element 71. The paper 76 is disposed within this aperture.

The paper sheet 76 has a lower surface printed with characters or colored symbols or alternatively with a fingerprint. The sheet 76 has the upper surface fixedly secured to the bottom surface of the transparent plate 75.

The transparent plate 75 may be formed of a light transmissive (or semitransparent) plastic plate or other material having similar property and has a bottom surface fixedly bonded to the upper surface of the light shield plate 74 except for the area where the paper sheet 76 is secured. A plurality of electrodes extend through the transparent plate 75 and the light shield plate 74 and are fixedly secured therein.

The electrodes 77 serve to electrically interconnect the card 20F and an external apparatus such as, for example, a card identifying apparatus, an automatic cash dispenser or the like and are electrically connected to the IC circuit 73 through signal lines (not shown) wired on and along the spacer 72 or the light shield plate 72.

The IC circuit 73 is disposed within the recess formed in the spacer 72 and includes a microprocessor 78 and a memory 79.

Figure 25:
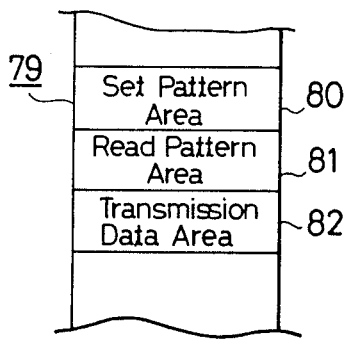
FIG. 25 is a view showing a map of the memory shown in FIG. 24.

Referring to FIG. 25 showing a memory map, the memory 79 includes a set pattern area 80 where set data corresponding to the pattern provided on the lower surface of the paper sheet 76 is stored, a read pattern area 81 where the pattern data read out by the pattern reading element is temporarily stored and a transmission data area 82 where data for transmission is stored.

Figure 26:
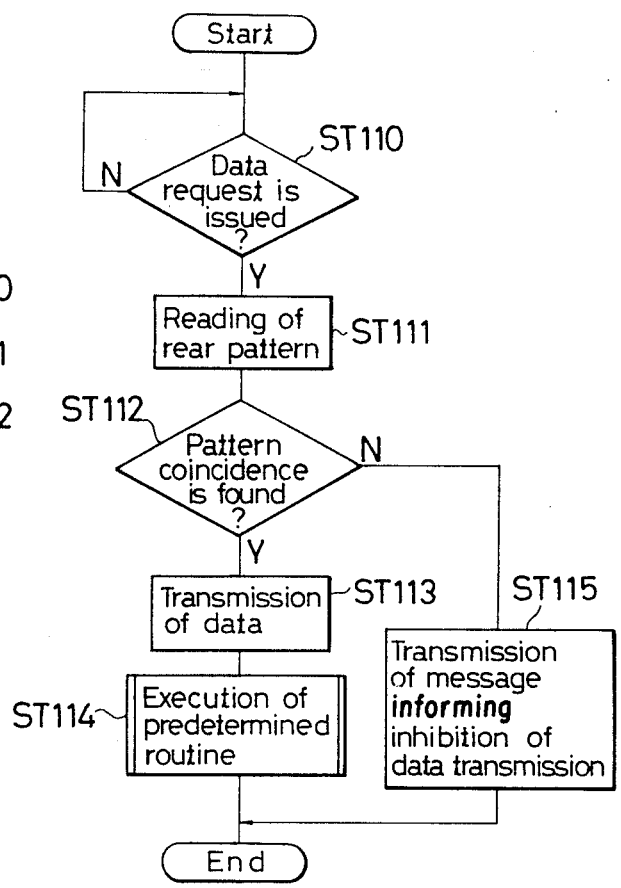
FIG. 26 is a view showing a flow chart for illustrating operation of the apparatus according to the sixth embodiment.

In the following, operation of the instant embodiment of the invention will be described by referring to a flow chart shown in FIG. 26.

It is assumed that the card 20F is loaded, for example, in a card identifying apparatus. On the assumption, the microprocessor 78 awaits the sending of a data request from the card identifying apparatus at a step ST110 shown in FIG. 26. Upon reception of the request, the microprocessor 78 fetches data from the pattern reading element 71 at a step ST111. At that time, the paper sheet 76 disposed in opposition to the pattern reading element 71 is illuminated by light impinging through the transparent plate 75. Consequently, the microprocessor 78 is supplied with data corresponding to the pattern provided on the lower surface of the paper sheet 76, the data being then transferred to the read pattern area 81 of the memory 79.

Next, the microprocessor 78 compares the data stored in the read pattern area 81 with the data stored in the set pattern area 80 at a step ST112. When coincidence results from the comparison, it is decided that the data stored in the memory 79 of this card is genuine data (i.e. the data not copied from other card), whereby a code indicating capability of transmission is supplied to the card identifying apparatus at a step ST113. Subsequently, the microprocessor 78 executes predetermined procedure such as, for example, transmission of data stored in the transmission data area 82 to the data identifying apparatus, whereupon operation is stopped.

On the other hand, when it is decided at the step ST112 that the data stored in the read pattern area 81 does not coincide with the data stored in the set pattern area 80, the program executed by the microprocessor 78 branches from the step ST112 to a step ST115 where a message informing of incapability of data transmission is sent to the card identifying apparatus, and the operation comes to an end.

With the structure of the card described above, a card 20F which has copied data stord in the memory of other card can be rendered unusable by virtue of the feature that the paper sheet 76 incapable of being copied is incorporated in the card 20F. In other words, preparation of any card by copying the card 20F is positively inhibited. In a version of the instant embodiment, the read pattern area 81 may be spared, and arrangement may be made such that the data outputted from the pattern reading element 71 are sequentially compared with the data placed in the set pattern area 80 on the real-time basis.

In each of the exemplary embodiments described so far, discriminative identification of the card is performed automatically either on the side of the card itself or on the side of the card reading apparatus. However, the card may be so implemented that genuineness thereof can be determined through visual observation by a person or operator in charge.

Figure 27:
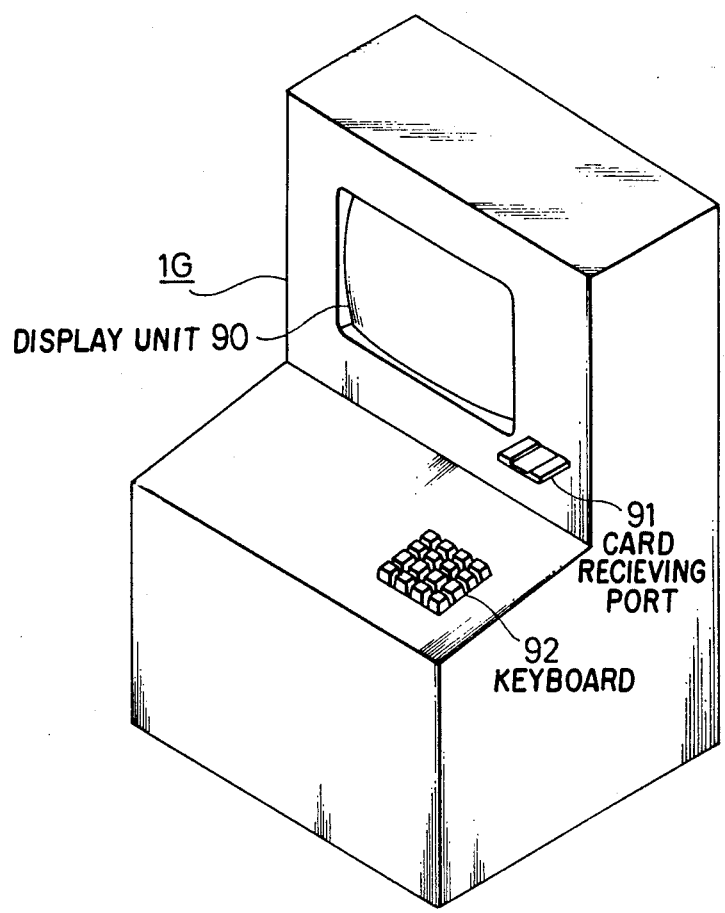
FIG. 27 is a schematic perspective view showing a card identifying apparatus for carrying out a card identifying method according to a seventh exemplary embodiment of the present invention.

FIG. 27 is a perspective view showing a card identifying apparatus according to a seventh embodiment of the present invention which is arranged to realize the discriminative identification of card in the manner mentioned above.

The card identifying apparatus 1G shown in FIG. 27 is arranged such that upon insertion of a card 20G (refer to FIG. 20), a pattern 60G (refer to FIG. 29) carried by the card 20G is read to be displayed on a display unit 90 and that pattern data stored in the card 20G is read out to be displayed in parallel with the first mentioned pattern. To this end, the card identifying apparatus 1G includes a card receiving port 91 provided on a customer reception panel, the display unit 90 for displaying processing procedure and results of processing, and a keyboard for inputting data for operation.

Figure 28:
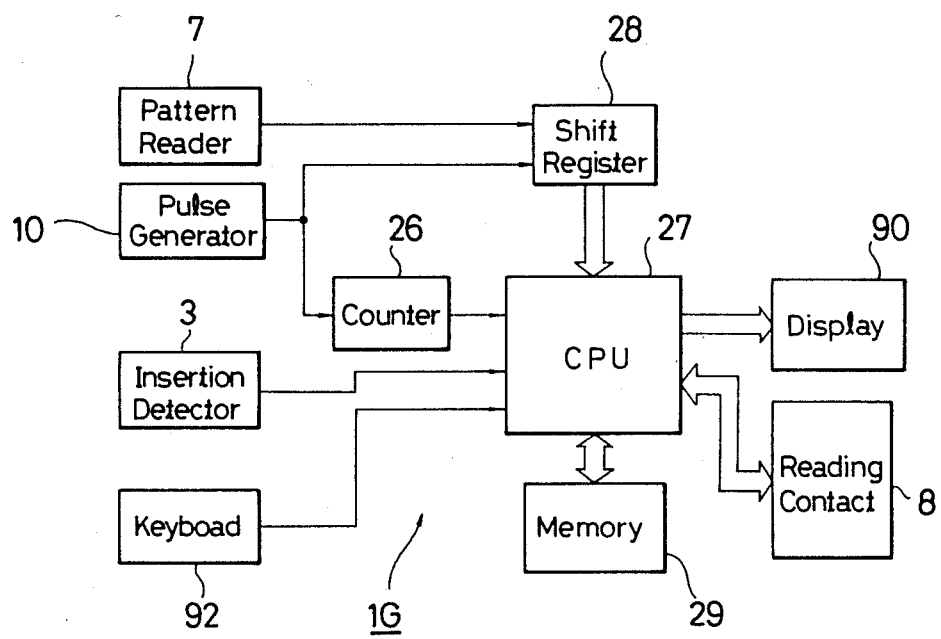
FIG. 28 is a view showing in a block diagram a circuit arrangement of the card identifying apparatus shown in FIG. 27.

FIG. 28 shows in a block diagram an exemplary circuit arrangement of the card identifying apparatus 1G. In this figure, parts corresponding to those shown in FIG. 15 are denoted by like reference symbols.

The circuit arrangement shown in FIG. 28 differs from the one shown in FIG. 15 in respect that operation of the CPU 27 can be controlled in dependence on data, codes or the like inputted through the keyboard 92 by operator and that the processing executed by the CPU 27 as well as the result of the processing can be displayed so that the operator may directly visually recognize the information displayed on the display unit 90.

Figure 29:
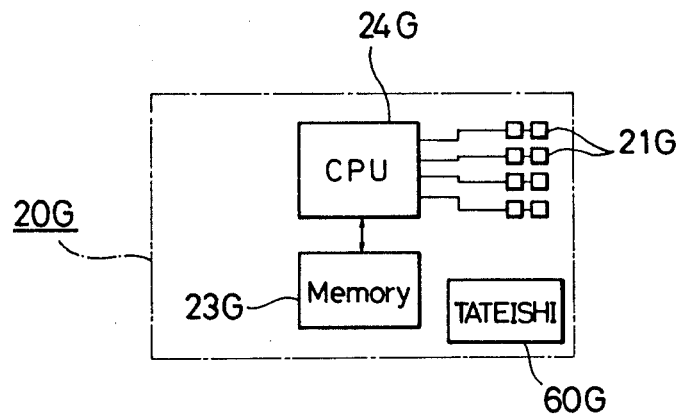
FIG. 29 is a view showing in a block diagram a circuit arrangement incorporated in a card employed in the card identifying apparatus according to the seventh embodiment.
Figure 30:
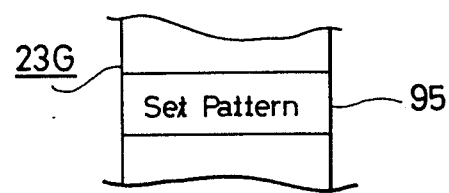
FIG. 30 is a view showing a memory map of the memory shown in FIG. 29.

FIG. 29 shows in a block diagram an exemplary circuit arrangement of a card 20G destined to be used in the card identifying apparatus 1G.

The card 20G shown in FIG. 29 has a surface provided with a pattern 60G such as an embossed pattern, a character pattern, a fingerprint pattern or the like and integrally incorporates a CPU 24G and a memory 23G, wherein data stored in the memory 23G can be outputted externally of the card through electrodes 21G or alternatively data can be supplied to the memory 23G by way of the electrodes 21G under the control of the CPU 24G.

The memory 23G includes a set pattern area 95 where pattern data representative of a characteristic feature or aspect of the aforementioned pattern 60G is stored.

Figure 31:
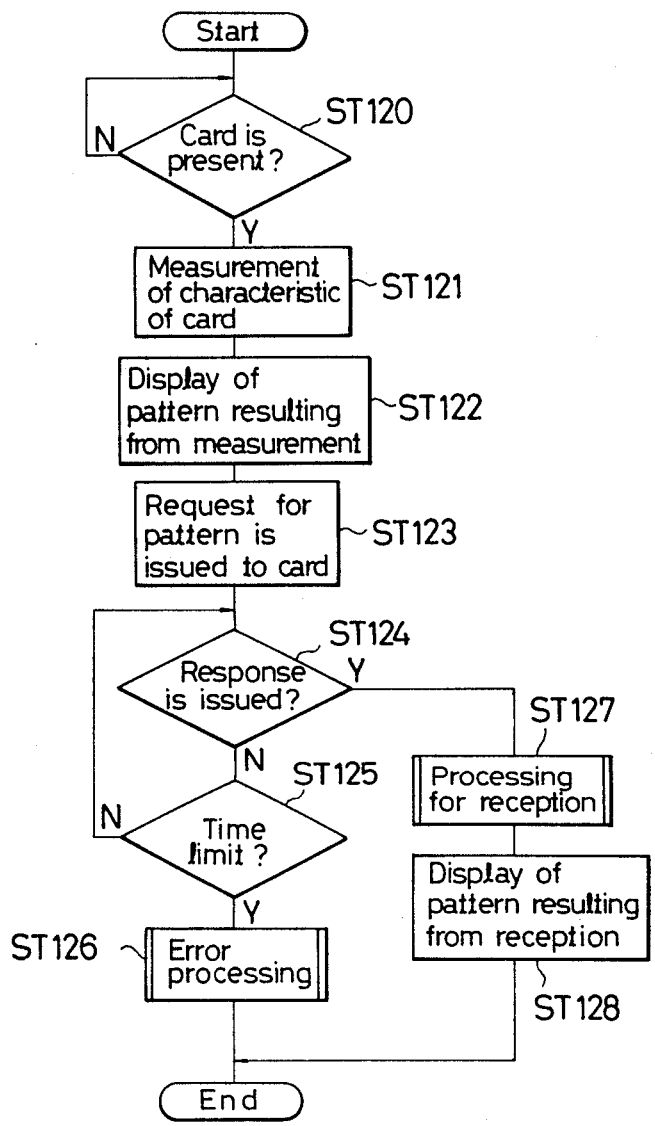
FIG. 31 is a view showing a flow chart for illustrating operation of the card identifying apparatus according to the seventh embodiment of the invention.

Next, description will be made on operation of the card 20G and the card identifying apparatus 1G by referring to a flow chart shown in FIG. 31.

Before the card 20G is inserted or loaded or in the card identifying apparatus 1G, the CPU 27 incorporated in the card identifying apparatus 1G is in the stand-by state as indicated by a step block ST120.

When an operator receives the card 20G from a customer and loads it in the card identifying apparatus 1G through the card insertion port 91, the insertion detector 3 detects this event and informs the CPU 27 of the presence of the card 20G. In response, the program executed by the CPU 27 branches from the step ST120 to a step ST121 where the CPU 27 fetches data output from the shift register 28 which has stored therein the output data of the pattern reader 7. Subsequently, at a step ST122, the CPU 27 transfers the pattern data supplied from the shift register 28 (i.e. the pattern data obtained by sensing the pattern 60G of the card 20G) to the display unit 90 to be displayed thereon.

Subsequently, at a step ST123, the CPU 27 issues a message requesting the supply of the pattern data stored in the memory 23G of the card 20G. At a step ST124, the CPU 27 checks if the card 20G responds to the aforementioned request message. Further, at a step ST125, the CPU 27 checks whether a predetermined time has lapsed since the issuing of the request message. Unless response is made within a predetermined time or period, the CPU 27 proceeds to a step ST126 from the step ST125 to execute error processing such as activation of a buzzer or the like, being followed by stoppage of operation. On the other hand, when response is issued from the card 20G within the predetermined period, the CPU 27 proceeds to a step ST127 from the step ST124 and receives the pattern data sent from the card 20G. Subsequently, at a step ST128, the pattern data is transferred to the display unit 90 to be displayed thereon in parallel with the pattern data displayed at the step ST122 to thereby allow the operator to check whether both the data patterns displayed in juxtaposition coincide with each other.

Subsequently, the card 20G is returned under the control of the CPU 27, whereupon operation comes to an end.

As will be appreciated from the above description, with the card identifying apparatus and the card structure according to the seventh embodiment of the present invention, operator can determine the genuineness or spuriousness of the card 20G.

Figure 32:
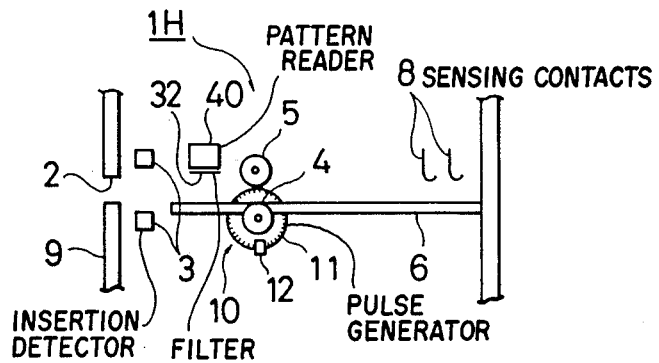
FIG. 32 is a schematic side view showing a major portion of the card identifying apparatus for carrying out the card identification method according to an eighth exemplary embodiment of the present invention.
Figure 33:
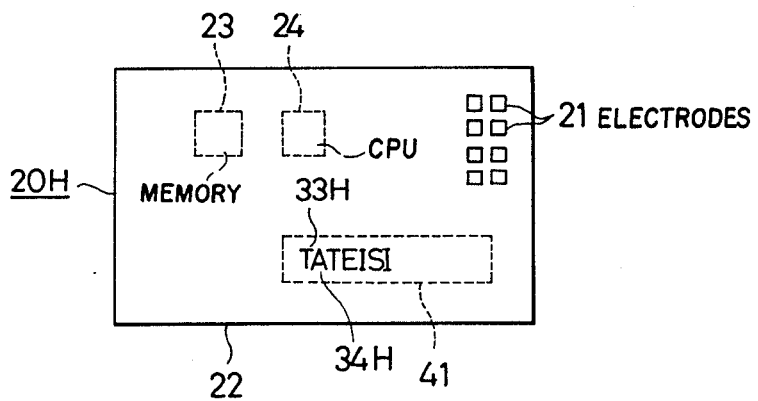
FIG. 33 is a top plan view of a card employed in the card identifying apparatus according to the eighth embodiment shown in FIG. 32.
Figure 34:
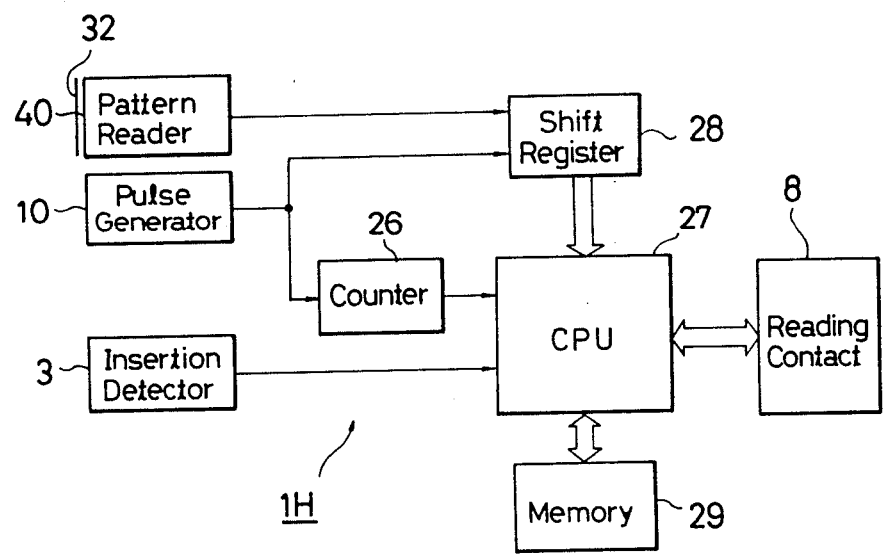
FIG. 34 is a view showing in a block diagram a circuit arrangement adopted in the card identifying apparatus shown in FIG. 32.

FIGS. 32 to 34 show an eighth embodiment of the present invention which correspond to a version or modification of the second embodiment described hereinbefore. According to the teaching of the invention incarnated in this embodiment, pattern information (data) and color information or data are both stored in a memory incorporated in an IC card. Upon insertion of the card into a card identifying apparatus, the color of the card is measured or sensed and compared with the color information read out from the memory. When the comparison results in coincidence between the sensed color information and the stored color information, it is decided that the inserted card is an authorized one.

The card identifying apparatus 1H shown in FIG. 32 is basically implemented in a same structure as the one shown in FIG. 1. However, the former differs from the latter in respect that the pattern reader 40 includes a color filter 32 for receiving therethrough the light from the card 20H disposed on a guide plate 6 to sense the color pattern of an optical pattern 41 (refer to FIG. 33) provided on the card 20H, whereby a signal representative of the result of detection is produced.

On the other hand, the card 20H to be used in the card identifying apparatus 1H is composed of a base plate 22 formed of plastic or the like material, a memory 23 and a CPU (Central Processing Unit) 24 both incorporated in the base plate 22, electrodes 21 provided on the upper surface of the base plate 22, and the optical pattern 41. This card 20H is a sort of the so-called IC card. The optical pattern 41 and the electrodes 21 are so positioned that in the course of the card 20H being inserted into the card identifying apparatus 1H, the optical pattern 41 is read by the pattern reader 40, while upon complete insertion of the card within the card identifying apparatus 1H, the electrodes 21 are brought into contact with the reading contacts 8.

In this connection, it should be mentioned that the optical pattern 41 is composed of a color pattern 33H which can be sensed or perceived by the pattern reader 40 (e.g. a pattern in red) and a color pattern 34H to which the pattern reader 40 has no sensitivity. Further, it should be noted that the memory 23 stores therein the pattern data corresponding to the color pattern 33H constituting a part of the optical pattern 41.

The circuit arrangement provided for the card identifying apparatus 1A as shown in FIG. 34 serves for the function mentioned below. Namely, upon insertion of the card 20H into the card identifying apparatus 1H, the identification data (pattern data) stored in the memory 23 integrally incorporated in the card 20H is read out to be compared with the color pattern information 33H of the card 20H as read by the pattern reader 40. When the comparison results in coincidence, decision is made to the effect that the card is an authorized one. To this end, the hardware structure includes the pattern reader 40, the color filter 32, the reading contacts 8, an insertion detector 3, a pulse generator 10, a counter 26, a CPU 27, a shift register 28 and a memory 29.

With the arrangement mentioned above, card identifying operation is carried out in a similar manner described hereinbefore in conjunction with the first and second embodiments of the invention.

Although the genuineness of the card is ascertained on the side of the card identifying apparatus in the case of the embodiment described above, such arrangement may be equally adopted in which the decision as to the genuineness of the card is made on the side of the card.

Figure 35:
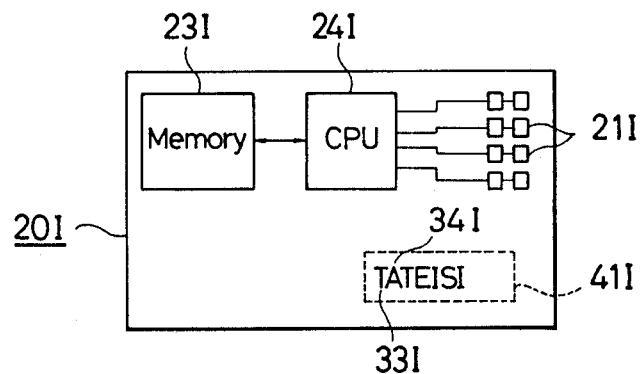
FIG. 35 is a view showing in a block diagram a circuit arrangement incorporated in a card employed in carrying out the card identification method according to a ninth embodiment of the present invention.

FIG. 35 is a block diagram showing a circuit arrangement provided on the side of the card for determining the genuineness or spuriousness of the card for the card identifying apparatus according to a ninth embodiment of the present invention.

The circuit shown in FIG. 35 is incorporated in a card 20I provided with an optical pattern 41I and composed of electrodes 21I exposed externally from a surface of the card 20I, a CPU 24I for performing transaction of data with external apparatus by way of the electrodes 21I, and a memory 23I controlled by the CPU 24I.

The optical pattern 41I is composed of a color pattern 33I which can be sensed or perceived by the pattern reader 40 (refer to FIG. 37) and a color pattern 34I to which the pattern reader 40 has no sensitivity.

The memory 23I includes a ROM for storing a program for the CPU 24I and a variety of constant data and a RAM providing a work area for the CPU 24I.

Figure 36:
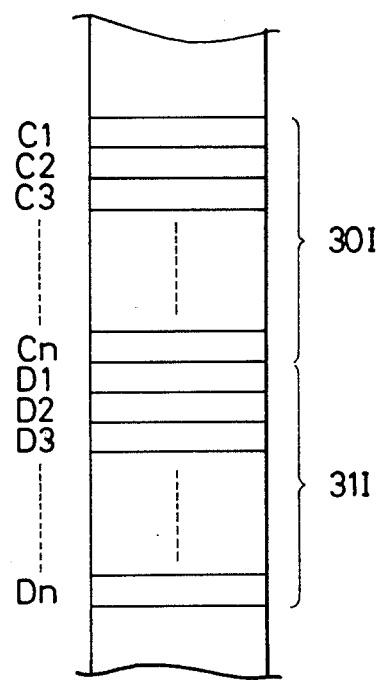
FIG. 36 is a view showing a memory map of the memory included in the circuit shown in FIG. 35.

As will be seen in FIG. 36 showing a memory map, the RAM includes as parts thereof a sensed pattern area 30I for storing data (pattern data) supplied through the electrodes 21I and a set pattern area 31I for storing identification data (pattern data) characterizing the color pattern 33I constituting a part of the optical pattern 25I provided on the card 20I.

Figure 37:
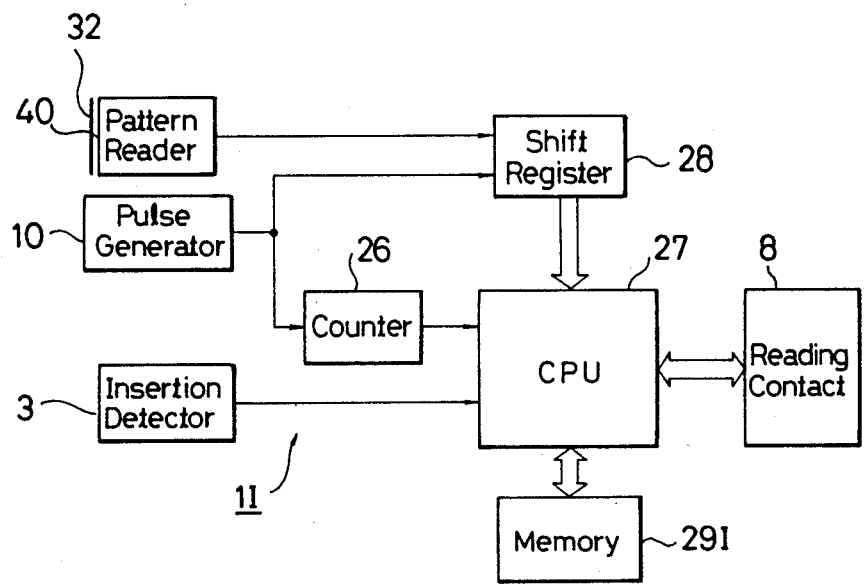
FIG. 37 is a view showing in a block diagram a circuit arrangement adopted in the card identifying apparatus according to the ninth embodiment of the invention.
Figure 38:
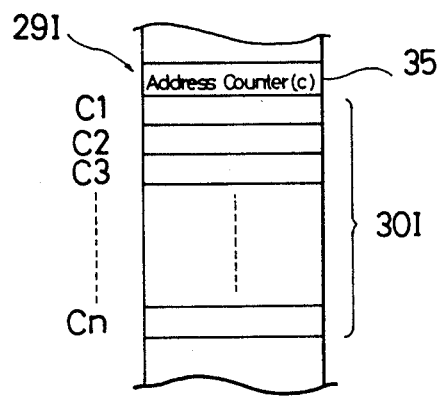
FIG. 38 is a view showing a memory map of the memory included in the circuit shown in FIG. 37.

FIG. 37 shows in a block diagram a circuit arrangement of the card identifying apparatus 1I according to the ninth embodiment of the present invention. In this figure, parts corresponding to those shown in FIG. 34 are denoted by like reference symbols.

The circuit arrangement shown in FIG. 37 differs from the one shown in FIG. 34 in that the memory 29I includes only a sensed pattern area 30I and an address counter 35.

It will be sufficient to mention that the CPU 27 performs operation in accordance with the procedure similar to that described hereinbefore with reference to the flow chart shown in FIG. 17.

Although the color patterns 33 and 33I are provided on the upper surfaces of the respective cards 20H and 20I in the case of the eighth and ninth embodiments described above, it should be understood that these color patterns may be provided interiorly of the cards as in the case of the card described hereinbefore in conjunction with the embodiment shown in FIG. 23(A), FIG. 23(B) and FIGS. 24 to 26.

FIGS. 39 to 43 are views showing a tenth embodiment of the present invention according to which information or data utilized for the decision as to the genuineness of a cord is stored in the form of a pattern in an area applied with a phosphorescent material.

Figure 39:
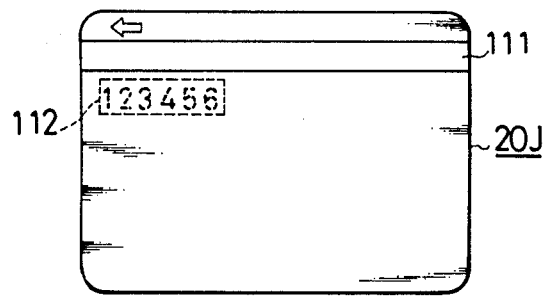
FIG. 39 is a top plan view of a magnetic card according to a tenth embodiment of the present invention.
Figure 40:
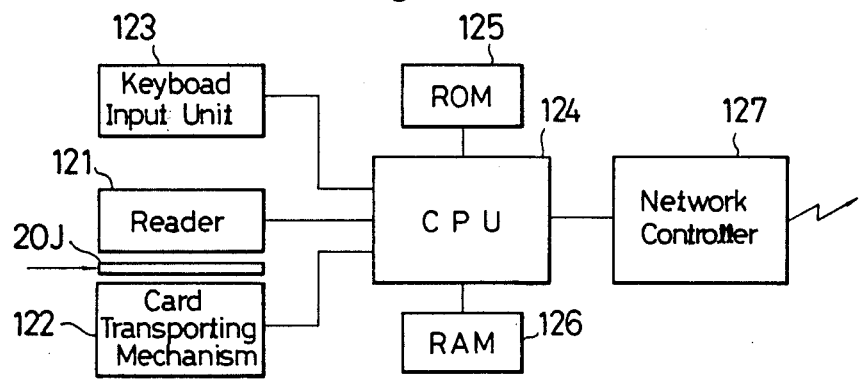
FIG. 40 is a view showing in a block diagram an arrangement of a card transaction processing apparatus including means for ascertaining the genuineness of the card shown in FIG. 39.

More specifically, FIG. 39 is a plan view of a magnetic card employed according to the instant embodiment. The card is provided with a magnetic stripe 111 in which information or data for transaction processing and an identification (ID) number are stored, and a phosphorescent recording area 112 in which the ID number is recorded in the form of numerals printed with a phosphorescent material. In the case of the instant embodiment, it is assumed that a phosphorescent material capable of emitting light upon exposure to infrared rays is employed. FIG. 40 shows in a block diagram a general arrangement of a card transaction processing apparatus (a terminal) such as a cash dispenser incorporating a card identifying apparatus according to another embodiment of the present invention, and FIG. 41 is a view showing schematically a general arrangement of a card reader 121 employed in the apparatus shown in FIG. 41.

Figure 41:
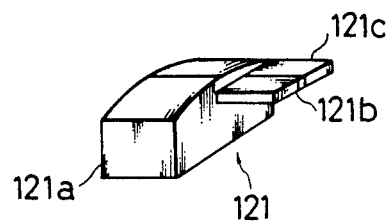
FIG. 41 is a view showing schematically a structure of a card reader for the card shown in FIG. 39.

Referring to FIG. 41, the reader 121 is composed of a magnetic head 121a for reading magnetic information written in the magnetic stripe 111 of the card 20J shown in FIG. 39, an infrared LED (light emitting diode) array 121b for exciting the phosphorescent recording area 112, and a CCD image sensor for reading the numerals written in the phosphorescent recording area 112. An interference filter may be provided in combination with the sensor 121c for improving the accuracy with which the numerals written in the phosphorescent recording area 112 can be read out.

Figure 42:
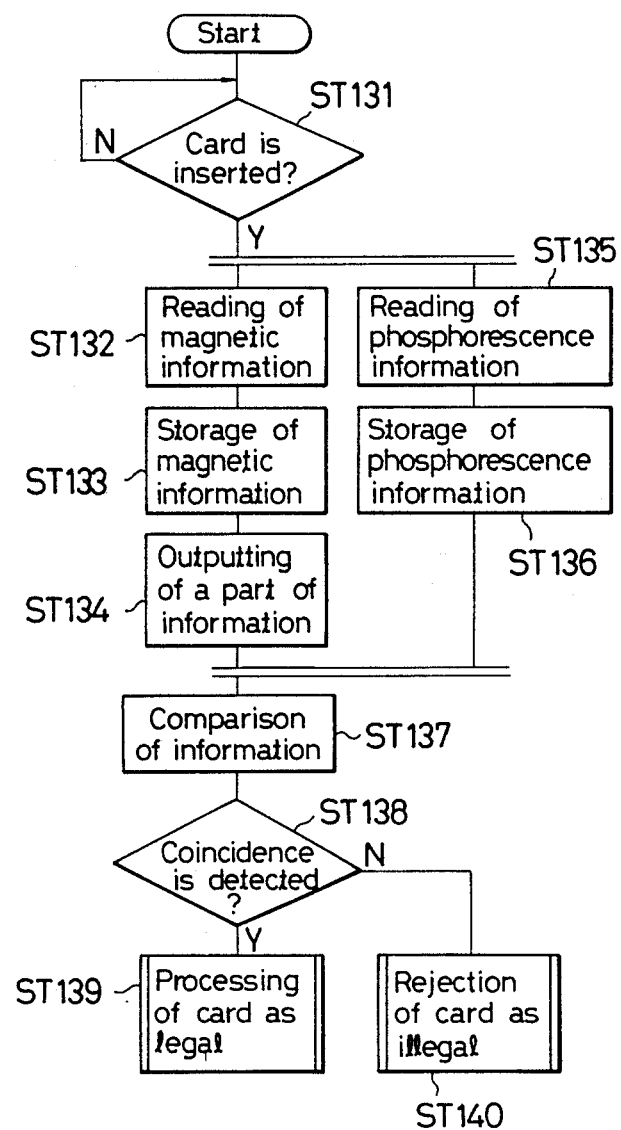
FIG. 42 is a view showing a flow chart for illustrating operation of the apparatus shown in FIG. 40.

Turning to FIG. 40, the card identifying apparatus according to the instant embodiment includes the card reader 121 mentioned above, a mechanism 122 for transporting and sensing the presence of the card 20J, an input unit 123 constituted by a keyboard, a central processing unit or CPU 124, a read-only memory or ROM 125 for storing a program such as illustrated in FIG. 42 and adapted to be executed by the CPU 124, and a random access memory or RAM 126 providing work area for the CPU 124. It should be mentioned that the CPU 124 is connected to a host computer by way of a network controller 127.

Next, operation of the apparatus according to the instant embodiment will be described by referring to the flow chart shown in FIG. 42. When the card 20J is inserted at a step ST131, routines including steps ST132 to ST134 and steps ST135 and ST136, respectively, are executed in parallel.

At the step ST132, the magnetic information recorded in the magnetic stripe 111 is read out by means of the magnetic head 121a of the card reader 121, being followed by storage of the information as read in the RAM 126 at the step ST133. At the nest step ST134, the ID number is extracted from the stored information.

At a step ST137, the ID number read out from the magnetic stripe 111 (steps ST132 to ST134) is compared with the ID number read out from the phosphorescent record area 112 (steps ST135 and ST136). When coincidence results from the above comparison, it is decided that the card 20J is an authorized one at a step ST139, whereby communication with the host computer can be performed in accordance with the transaction processing information carried by the magnetic stripe 111 as well as information inputted through the keyboard input unit 123.

On the other hand, when discrepancy is found between both ID numbers at the step ST138, execution of the program branches to a step ST140 where the card 20J is returned though the transporting mechanism 12 or recovered interiorly of the apparatus. In other words, the card is processed as the unauthorized one.

Although it has been described that the ID information is recorded in the form of numerals in the phosphorescent record area 112, it can be stored in the form of other symbols such as bar code or the like. In case the ID information is recorded in the form of bar code, the CCD image sensor 121c may be replaced by a photosensor.

Figure 43:
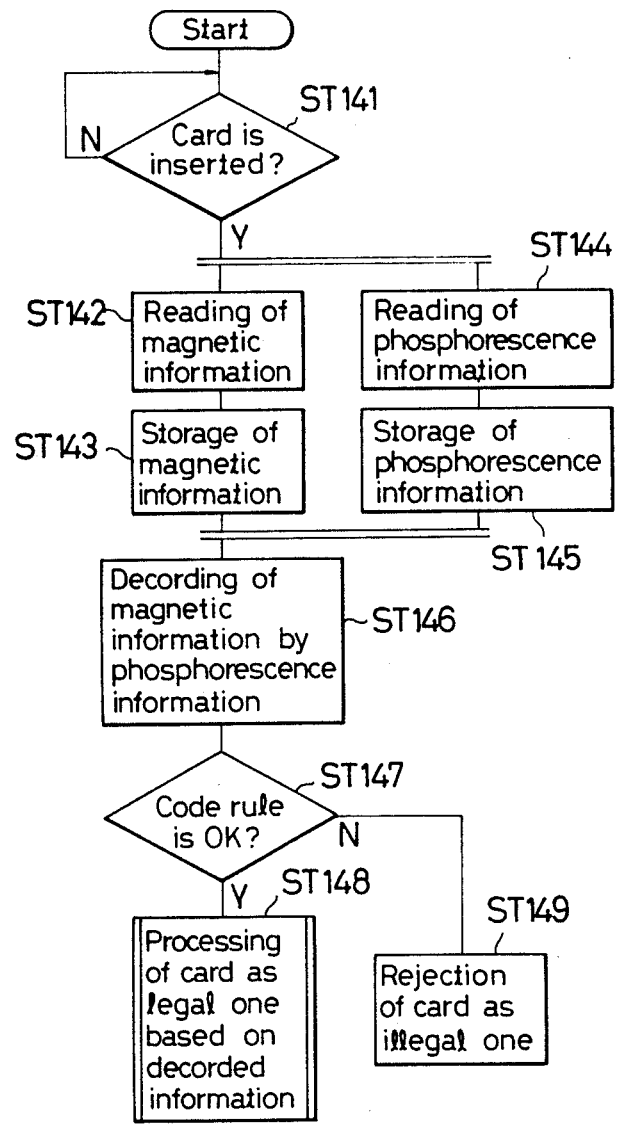
FIG. 43 is a view showing a flow chart for illustrating operation of a card identifying system according to an eleventh embodiment of the present invention.

Further, information recorded in the magnetic stripe can be encoded (scrambled), while the information corresponding to that resulting from the decoding of the information read out from the magnetic stripe 111 may be stored in the phosphorescent record area 112. FIG. 43 shows in a flow chart an eleventh embodiment of the invention based on the above principle.

Referring to FIG. 43, when the card is inserted at a step ST141, the program proceeds to routines including steps ST142 and ST143 and steps ST144 to ST145, respectively, to be executed in parallel.

At the steps ST142 and ST143, reading and storage of information or data recorded in the magnetic stripe are performed, while through the routine including the steps ST144 to ST145, reading and storage of data from the phosphorescent record area are carried out. Subsequently, at a step ST146, the data read out from the magnetic stripe is decoded by using the data read out from the phosphorescent record area, being followed by a step ST147 where the decoding can be accomplished as a result of coincidence between the code rules of both data.

Upon coincidence being found in the code rule, a step ST148 is then executed where the card is processed as an authorized one in accordance with the decoded data. Otherwise, execution of the program proceeds to a step ST149 where the card is rejected as the unauthorized or illegal card.

It goes without saying that the present invention is not restricted to the magnetic card but can be equally applied to laser cards, IC cards and the like. In the case of an IC card, the data stored in the phosphorescent record area of that card is read out on the side of the card transaction processing apparatus, the data thus read being transferred to the card where the processing for examining the genuineness of the IC card is performed by utilizing the data transferred thereto.

As will be appreciated, with the arrangement of the eleventh embodiment of the present invention described above, the decision as to the genuineness or spuriousness of the card can be made even the data stored in the card is copied data, so long as the identification data stored in the phosphorescent area is not copied.

Figure 44:
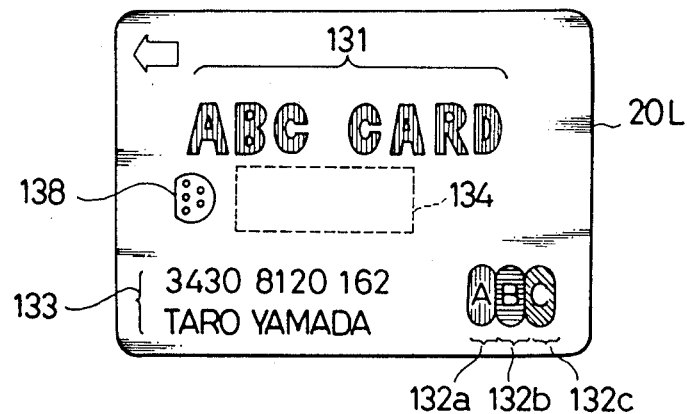
FIG. 44 is a top plan view of an IC card according to a twelfth embodiment of the present invention.
Figure 45:
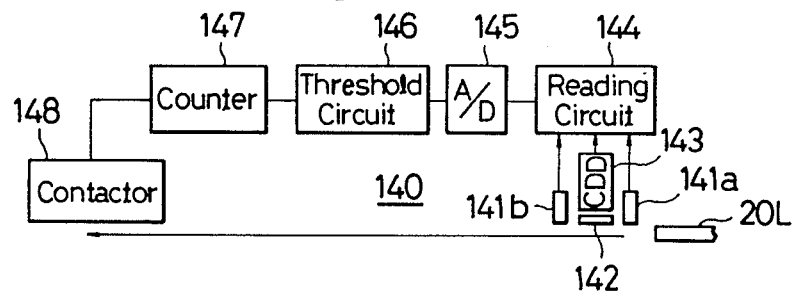
FIG. 45 is a view showing in a block diagram an arrangement of a color reader of a card transaction processing apparatus in which the card shown in FIG. 44 is employed.
Figure 46:
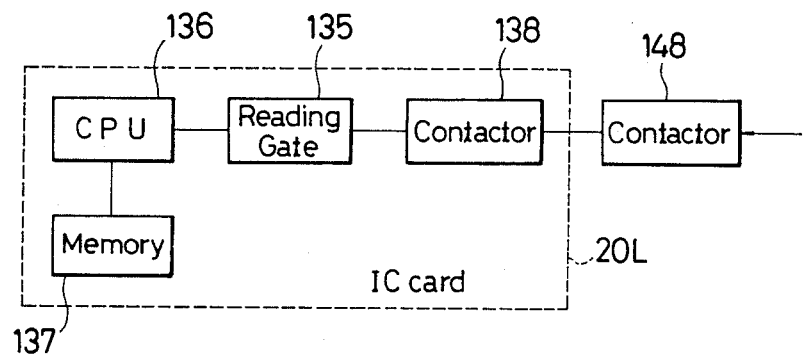
FIG. 46 is a view showing in a block diagram an electric system incorporated in the IC card shown in FIG. 44.

FIGS. 44 to 46 are views showing a twelfth embodiment of the present invention arranged such that the genuineness of spuriousness of a card is determined by comparing a predetermined colored area provided on the card surface with a predetermined reference or standard area. More specifically, FIG. 44 is a plan view of the IC card prepared according to the instant embodiment, FIG. 45 is a block diagram showing a color reader device 140 of a transaction processing apparatus for which the IC card 20L shown in FIG. 44 is used, and FIG. 46 is a block diagram showing an electric system incorporated in the IC card 20L. The decision as to the genuineness or spuriousness of the IC card 20L is made on the basis of an area provided on a card surface and colored in red on the side of the card 20L.

Referring to FIG. 44, the card 20L is printed with a company logo in red "ABC CARD", by way of example, which indicates the name of card issuing company. Additionally, logo marks "A" 132a, "B" 132b and "C" 132c are printed in red, blue and green, respectively. An embossed area 133 as formed carries information about a member identification number and member's name.

The card 20L further includes an IC 134 which is generally composed of a reading gate 135, a central processing unit or CPU 136 and a memory (ROM or EPROM) 137. Power supply lines are omitted from illustration. The reading gate 135 of the card 20L is connected to contacts 138. A memory 137 stores therein data representative of the standard or reference area for making decision as to genuineness or spuriousness of the card 20L through comparison with the red area.

Referring to FIG. 45, the color reader 140 of the card processing apparatus includes a card transporting mechanism (not shown) for transporting the card 20L in the direction (auxiliary scanning direction) indicated by an elongated arrow, switches 141a and 141b for detecting the presence of the inserted and transported card, a filter 142 capable of transmitting only red color such an interference filter 142, a one-dimensional CCD image sensor 143 extending in the direction (main scanning direction) orthogonal to the plane of the drawing, a circuit 144 for reading output signals from the sensor 143, an analogue-to-digital or A/D converter 145 for converting the analogue signal output from the reading circuit 144 into a digital signal, a threshold circuit 146, a counter 147, and contacts 148 brought into contact with the contacts 138 provided on the card 20L.

Operation of the system of the structure described above will now be elucidated by referring to FIG. 45. When the leading edge of the IC card 20L has reached the switch 141a of the color reader 140, the reading circuit is put into operation to read the area printed in red on the surface of the IC card 20L through the filter 142 and the sensor 143. This reading operation is continued until the trailing edge of the IC card 20L has reached the switch 141b.

The signal resulting from the reading operation mentioned above undergoes A/D conversion and is then transformed into a binary signal such that a red signal component of high intensity is represented by logic "1" with the red component of low intensity being represented by logic "0" on the pixel-by-pixel basis. The binary signal thus derived is counted by the counter. Consequently, the counted value represents a total sum of the areas 131 and 132a printed in red. The IC card 20L stops upon contact being made between the contacts 138 and the contacts 148 of the color reader 140.

Referring to FIG. 46, operation taking place on the side of the IC card is as follows. The CPU 136 reads the contents (sum of the areas 131 and 132a printed in red on the surface of the card 20L) of the counter 147 of the color reader 140 through the contacts 138 and the reading gate 135 and compares with the red reference area data stored in the memory 137. When the area in red as read coincides with the reference red area with a tolerance of less than ±5%, the card is determined to be the genuine card. Otherwise, the inserted card is regarded as an unauthorized card. In the latter case, the CPU 136 may be inhibited from the transaction with the processing apparatus incorporating the color reader 140 or issue a command to reject the IC card 20L to the processing apparatus. Of course, the usual transaction is performed in case the examination of the card has proved the genuineness thereof.

According to the instant embodiment, decision as to the genuineness or spuriousness of the IC card 20L is made on the side of the IC card. Accordingly, the data representative of the reference (standard) area is outputted only to the IC card 20L, whereby the confidence of information can be positively assured, to an advantage. Further, the security of information can be enhanced by storing the sum of areas printed in a predetermined color in an encoded (scrambled) form.

Although the color reading is effected by using the filter 142 and the CCD image sensor 143 in the case of the twelfth embodiment, it will be understood that a color camera may be employed with luminance intensity signals being set for each of three primaries R, G and B, to thereby measure the sum of areas printed in a predetermined color.

It is obvious that the decision as to genuineness or spuriousness of the card based on the area in a predetermined color can be made on the side of the card transaction processing apparatus and may be equally applied to the magnetic card and the laser card.

As will be appreciated, the twelfth embodiment of the invention which is so arranged as to perform the identification of the genuine card on the basis of information of the area (sum area) printed in a predetermined color allows the decision as to the genuineness of the card to be performed even in the case where the data carried by the card is copied data.

Although the present invention has been described in conjunction with exemplary embodiments thereof, it should be understood that numerous variations and modifications of these embodiments will readily occur to those skilled in the art without departing from the spirit and scope of the invention set forth in annexed claims.

What is claimed is:

1. A method of discriminatively identifying a card, said card having a predetermined characteristic feature, and further including means incorporated in said card for checking said characteristic feature and a memory incorporated in said card for storing preset information indicative of said characteristic feature, said method comprising the steps of:
   (a) sensing the characteristic feature of said card;
   (b) sending data relating to the characteristic feature sensed in step (a) to said checking means;
   (c) retrieving said information indicative of said characteristic feature from said memory;
   (d) comparing said characteristic feature sensed in step (a) with said information retrieved in step (c); and
   (e) deciding said card is an authorized card when said comparison results in coincidence.

2. A method of discriminatively identifying a card according to claim 1, wherein an embossed area indicating said characteristic feature of said card is provided in said card, while said information indicative of said characteristic feature carried by said embossed area is stored in said memory.

3. A method of discriminatively identifying a card according to claim 1, wherein said characteristic feature of the card is provided in said card in the from of a character pattern, while said information indicative of said characteristic feature represented by said character pattern is stored in said memory.

4. A method of discriminatively identifying a card according to claim 1, wherein a fingerprint of a specified person is imparted to said card as the characteristic feature of said card, said memory storing therein information representative of the characteristic feature of said fingerprint.

5. A card identifying method, in which a predetermined color is applied to a card as a characteristic element, therefore while color information characteristically representative of the color of said card is stored in a memory incorporated in said card, said predetermined color is measured, wherein the result of said measurement being compared with the color information read out of said memory, to decide the genuineness of said card when said comparison between said measured color information and said read color information results in coincidence.

6. A card identifying method according to claim 5, wherein the information characteristically identifying said card is composed of a colored character pattern.

7. A card composed of a substrate constituting a base plate of said card, a pattern reading element disposed on said substrate, a spacer disposed on said substrate so as to enclose said pattern reading element, a light transmitting plate disposed on an upper surface of said spacer, and an optical pattern disposed on a lower surface of said light transmitting plate in opposition to said pattern reading element, wherein upon reading of said card, said optical pattern is read by said pattern reading element under the command of control means provided internally and externally of said card, said card being identified as an authorized card when said optical pattern coincides with a predetermined pattern.

8. An apparatus for determining genuineness or spuriousness of a card on which information for determination of the genuineness or spuriousness of said card is recorded in the form of a phosphorescent pattern, said apparatus comprising means for reading said information, and means for comparing the information output from said reading means with reference information to determine the genuineness or spuriousness of said card.

9. An apparatus according to claim 8, further comprising means for sensing a characteristic feature input by a user of the card, and means for comparing said characteristic feature input by the user with said reference information.

10. A card to be inserted in and searched by a card transaction apparatus, said card comprising an area colored in a predetermined color provided on a surface of said card means for storing a reference area of said predetermined color, and means for comparing said area of said predetermined color read by said card transaction apparatus with said reference area held by said storing means to determine the genuineness or spuriousness of said card.

11. An apparatus for identifying genuineness of a card, including means for reading an area of a predetermined color provided on a surface of said card, means for storing a reference area of said color, and means for comparing said area sensed by said reading means with said reference area stored in said storing means for determining genuineness or spuriousness of said card.

12. A method of discriminatively identifying a card, said card being imparted with a fingerprint of a specified person as a characteristic feature, and information representative of the charactistic feature of said fingerprint being previously stored in a memory incorporated in said card, said method comprising the steps of:
   (a) sensing the fingerprint imparted to said card;
   (b) retrieving said information representative of the characteristic feature of the fingerprint from said memory;
   (c) comparing said fingerprint sensed in step (a) with said information retrieved in step (b);
   (d) sensing a fingerprint of a user of the card and comparing it with the information representative of the characteristic feature of the fingerprint stored in said memory; and
   (e) deciding said card is an authorized card when said comparison in step (c) and said comparison in step (d) result in coincidence.

13. A method of discriminatively identifying a card according to claim 13, wherein said fingerprint included in said card is that of an authorized holder of said card.

14. A method of discriminatively identifying a card according to claim 13, wherein said memory incorporated in said card is an IC memory.

15. A method of discriminatively identifying a card, said card being imparted with a signature of a specified person as a characteristic feature, and information representative of the characteristic feature of said signature being previously stored in a memory incorporated in said card, said method comprising the steps of:
   (a) sensing the signature imparted to said card;
   (b) retrieving said information representative of the characteristic feature of the signature from said memory;
   (c) comparing said signature sensed in step (a) with said information retrieved in step (b);
   (d) sensing a signature of a user of the card;
   (e) comparing the signature of the user with the information representative of the characteristic feature of the signature stored in said memory; and
   (f) deciding said card is an authorized card when said comparison in step (c) and said comparison in step (e) result in coincidence.

16. A method of discriminatively identifying a card according to claim 15, wherein the signature imparted to said card is that of an authorized holder of said card.

* * * * *